(12) United States Patent
Kepecs

(10) Patent No.: US 7,552,069 B2
(45) Date of Patent: Jun. 23, 2009

(54) TECHNIQUES FOR OPTIMIZING PROMOTION DELIVERY

(75) Inventor: Jonathan Kepecs, Woodside, CA (US)

(73) Assignee: Concept Shopping, Inc., Lisle, IL (US)

( * ) Notice: Subject to any disclaimer, the term of this patent is extended or adjusted under 35 U.S.C. 154(b) by 1983 days.

(21) Appl. No.: 09/747,776

(22) Filed: Dec. 22, 2000

(65) Prior Publication Data

US 2001/0032128 A1    Oct. 18, 2001

Related U.S. Application Data

(60) Provisional application No. 60/171,885, filed on Dec. 23, 1999.

(51) Int. Cl.
*G06Q 30/00* (2006.01)
(52) U.S. Cl. .................................................. 705/14
(58) Field of Classification Search .................... 705/1, 705/10, 14
See application file for complete search history.

(56) References Cited

U.S. PATENT DOCUMENTS

| | | | |
|---|---|---|---|
| 4,554,446 A | 11/1985 | Murphy et al. |
| 4,723,212 A | 2/1988 | Mindrum et al. |
| 4,817,043 A | 3/1989 | Brown |
| 4,825,045 A | 4/1989 | Humble |
| 4,882,675 A | 11/1989 | Nichtberger et al. |
| 4,896,791 A | 1/1990 | Smith |
| 4,910,672 A | 3/1990 | Off et al. |
| 4,941,090 A | 7/1990 | McCarthy |
| 4,949,256 A | 8/1990 | Humble |
| 4,982,346 A | 1/1991 | Girouard et al. |
| 5,039,848 A | 8/1991 | Stoken |
| 5,056,019 A | 10/1991 | Schultz et al. |
| 5,117,355 A | 5/1992 | McCarthy |
| 5,173,851 A | 12/1992 | Off et al. |
| 5,185,695 A | 2/1993 | Pruchnicki |
| 5,201,010 A | 4/1993 | Deaton et al. |
| 5,231,568 A | 7/1993 | Cohen et al. |
| 5,305,195 A | 4/1994 | Murphy |
| 5,373,440 A | 12/1994 | Cohen et al. |
| 5,380,991 A | 1/1995 | Valencia et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |

(Continued)

FOREIGN PATENT DOCUMENTS

AU    755875    4/2003

(Continued)

OTHER PUBLICATIONS

Are profits deserved? by A. Grant Brown from Journal of Business Ethics v11n2 pp. 105-114 dated Feb. 1992.*

(Continued)

*Primary Examiner*—Jeffrey D Carlson
(74) *Attorney, Agent, or Firm*—Aka Chan LLP

(57) ABSTRACT

Techniques for generating and making incentive offers and promotions to consumers to influenced the consumers' purchasing behavior. Offers are customized for each individual consumer based on the particular consumer's purchase history information (or shopping history) and the consumer's response to the offers.

35 Claims, 12 Drawing Sheets

U.S. PATENT DOCUMENTS

| | | | |
|---|---|---|---|
| 5,459,306 A | 10/1995 | Stein et al. | |
| 5,467,269 A | 11/1995 | Flaten | |
| 5,612,868 A | 3/1997 | Off et al. | |
| 5,638,457 A | 6/1997 | Deaton et al. | |
| 5,687,322 A | 11/1997 | Deaton et al. | |
| 5,708,782 A | 1/1998 | Larson et al. | |
| 5,710,886 A | 1/1998 | Christensen et al. | |
| 5,710,887 A | 1/1998 | Chelliah et al. | |
| 5,717,866 A | 2/1998 | Naftzger | |
| 5,761,648 A | 6/1998 | Golden et al. | |
| 5,832,457 A | 11/1998 | O'Brien et al. | |
| 5,855,007 A | 12/1998 | Jovicic et al. | |
| 5,857,175 A | 1/1999 | Day et al. | |
| 5,903,874 A | 5/1999 | Leonard et al. | |
| 5,907,830 A | 5/1999 | Engel et al. | |
| 5,909,023 A | 6/1999 | Ono et al. | |
| 5,923,016 A | 7/1999 | Fredregill et al. | |
| 5,924,080 A | 7/1999 | Johnson | |
| 5,956,694 A | 9/1999 | Powell | |
| 5,970,124 A | 10/1999 | Csaszar et al. | |
| 5,970,469 A * | 10/1999 | Scroggie et al. | 705/14 |
| 5,970,470 A | 10/1999 | Walker et al. | |
| 5,974,399 A | 10/1999 | Giuliani et al. | |
| 6,009,411 A | 12/1999 | Kepecs | |
| 6,014,634 A | 1/2000 | Scroggie et al. | |
| 6,014,638 A | 1/2000 | Burge et al. | |
| 6,026,370 A | 2/2000 | Jermyn | |
| 6,029,139 A | 2/2000 | Cunningham et al. | |
| 6,039,244 A | 3/2000 | Finsterwald | |
| 6,044,362 A | 3/2000 | Neely | |
| 6,055,573 A | 4/2000 | Gardenswartz et al. | |
| 6,076,068 A | 6/2000 | DeLapa et al. | |
| 6,076,071 A | 6/2000 | Freeny, Jr. | |
| 6,115,693 A | 9/2000 | McDonough et al. | |
| 6,134,534 A | 10/2000 | Walker et al. | |
| 6,185,541 B1 | 2/2001 | Scroggie et al. | |
| 6,237,145 B1 | 5/2001 | Narasimhan et al. | |
| 6,330,543 B1 * | 12/2001 | Kepecs | 705/14 |
| 6,389,401 B1 | 5/2002 | Kepecs | |
| 6,401,080 B1 * | 6/2002 | Bigus et al. | 705/37 |

FOREIGN PATENT DOCUMENTS

| | | |
|---|---|---|
| EP | 1029302 | 8/2000 |
| EP | 1192573 | 4/2002 |
| JP | 407065242 A | 3/1995 |
| JP | 408161635 A | 6/1996 |
| WO | WO 85/01373 A1 | 3/1985 |
| WO | WO 92/14213 A1 | 8/1992 |
| WO | WO 92/20030 A1 | 11/1992 |
| WO | WO 93/16443 A1 | 8/1993 |
| WO | WO 94/09440 A1 | 4/1994 |
| WO | WO 95/21428 A1 | 8/1995 |
| WO | WO 97/23838 A1 | 7/1997 |
| WO | WO 97/30409 A2 | 8/1997 |
| WO | WO 98/38589 A1 | 3/1998 |
| WO | WO 99/12115 A1 | 3/1999 |
| WO | WO 99/26176 * | 5/1999 |
| WO | WO 99/26176 A1 | 5/1999 |
| WO | WO 00/41115 A1 | 7/2000 |
| WO | WO 00/67174 A1 | 11/2000 |
| WO | WO 01/46892 A1 | 6/2001 |
| ZA | 98/10678 | 10/1999 |

OTHER PUBLICATIONS

Office Action dated Jan. 11, 2005 for corresponding Canadian application No. 2,395,852.

Beck, J., "3 Types of Systems Drive Coupon Programs," *Supermarket News*, 37:48 (1987).

"Banyan Joins the Vultures Picking Over the 3+, 3+ Open Corpse," *Computergram International*, Nov. 5, 1992.

"World's First Smart Card Frequent Flyer Scheme Debuts," Newbyte News Network, Sep. 1997.

"Intellipost Launches BonusMail With 50,000 Charter Members," Byline: Business Editors/Computer Writers, Jun. 1997.

Kremer, J., "Mail Order Selling Made Easier," Ad-Lib Publications, pp. 75-79 (1983).

Taylor, S. "Don't Become Confined by The Box," *Advertising Age*, 68:26 (1997).

PR Newswire, "Caldor Announces Agreement with New York State Attorney General," Jan. 11, 1993.

* cited by examiner incented_products

Beggin Strips

| Field | Value | Ref |
|---|---|---|
| Name | Beggin Strips | 602 |
| Advertised Product | 604 — begginst... [Edit] [New] | |
| Shelf price | $3.00 | 606 |
| Club price | $2.50 | 608 |
| Good | $2.50 | 610 |
| Better | $2.25 | 612 |
| Best | $2.00 | 614 |
| Break Even Retail | $1.50 | 616 |
| Min ad availability | 7 days | 618 |
| Max ad availability | No Limit days | 620 |
| Limit per trip | 3 Items | 622 |
| Limit per shopper | No Limit Items | 624 |

626

628
| Ad Optional After | Never | |
|---|---|---|
| Shopper Budget | $0.00 | 630 |
| Min Product Budget | $ | 632 |
| Target Product Budget | $ | 634 |
| Max Product Budget | $ | 636 |
| Min CPG Budget | $ | 638 |
| Target CPG Budget | $ | 640 |
| Max CPG Budget | $ | 642 |

[OK] [CANCEL]

*FIG. 6*

TECHNIQUES FOR OPTIMIZING PROMOTION DELIVERY

CROSS-REFERENCES TO RELATED APPLICATIONS

The present application claims priority from U.S. Provisional Patent Application No. 60/171,885, filed Dec. 23, 1999 entitled "YIELD MANAGEMENT SYSTEM AND METHOD" the entire disclosure of which is herein incorporated by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present application relates generally to performing promotion management functions in a marketing system, and more particularly to techniques for generating offers to a consumer with a view towards influencing the consumer's purchasing behavior.

Several techniques are used presently to influence the purchasing behavior of consumers. Typically, these techniques offer discounts or other incentives to consumers on goods and services which are to be promoted. For example, printed coupons offering discounts on the promoted products may be distributed to consumers and may be redeemed by the consumers when a consumer purchases the promoted product at the point-of-sale (POS). These coupons are generally distributed to consumers in a random manner or in a more demographically focused manner, e.g. via blanket mailings to residents of a neighborhood or region. A major drawback of this method of distribution is that the coupons are not targeted to consumers most likely to use the coupons. This often results in consumers receiving coupons which are irrelevant and uninteresting to the consumers. As a result, a large percentage of the coupons are never redeemed, and are hence very ineffective in influencing a consumer's purchasing behavior. Further, from the manufacturer's and retailer's, or any seller's standpoint, the resources and money needed to print and distribute the coupons is not efficiently used and subsequently wasted.

With the advent of loyalty cards which enable point-of-sale systems to capture consumer purchase history information which comprises information related to purchases made by the consumer. By basing the distribution of coupons upon the consumer purchase history information, retailers and manufacturers have had better success in targeting potential purchasers of a particular product. Additionally, the distribution may be based upon demographic information provided by the consumer when applying for the loyalty card. Retailers and/or manufacturers are now able to target potential purchasers for a product by executing simple queries (e.g. "People who buy Product X more than twice per week and who spend more than $30 per month at a store") against the captured information. Consumers who match the query criteria then receive an incentive offer or coupon on a product associated with the query criteria. According to another technique, based on the captured information, the consumers are classified into one or more segments based on geodemographic characteristics, economic characteristics, age characteristics, etc. associated with the consumers. Incentives or coupons are then distributed to consumers based on the segment(s) to which the consumer belongs.

While the "query-based" and "segment-based" techniques described above achieve better results than a random or blanket targeting technique, they fail to take into consideration a particular consumer's unique shopping preferences which are not truly represented by either the segment in which the consumer is classified or by the query criteria. Further, a majority of above-mentioned techniques fail to take into consideration the consumer's response to the incentives or offers. For example, information such as information relating to offers which are not responded to by a consumer, which may be vital for making a subsequent offer to the consumer, is not captured or even considered by conventional techniques. As a result, conventional marketing techniques fail to achieve the one-to-one (1-1) target marketing desired by retailers and manufacturers. Effective 1-1 targeting of consumers thus remains difficult and elusive.

In light of the above, there is a need for marketing techniques which achieve one-to-one marketing and which resolve disadvantages and limitations of conventional systems. It is also desirable that these marketing techniques be easily scalable. It is also desirable that these techniques allow both retailers and manufacturers to maximize profits and foster brand loyalty while allowing them to reward their loyal consumers.

SUMMARY OF THE INVENTION

The present invention pertains to techniques for generating and making incentive offers and promotions to consumers to influence the consumers' purchasing behavior. According to the teachings of the present invention, the offers are customized for each individual consumer based on the particular consumer's purchase history information (or shopping history) and the consumer's response to the offers. In this manner, the present invention achieves highly personalized and true one-to-one marketing targeted for an individual consumer.

According to an embodiment, the present invention provides techniques for making offers to consumers. The embodiment of the present invention receives information identifying a plurality of consumers. The embodiment also receives purchase history information for the plurality of consumers which comprises information related to purchases made by the plurality of consumers. The present invention identifies a first consumer from the plurality of consumers based upon the purchase history information and the information identifying the plurality of consumers. In accordance with the present invention, a first offer is generated for the first consumer and provided to the first consumer. The first offer offers a first product for purchase by the first consumer at a first price for a first time period. The present invention determines if the first consumer purchased the first product at the first price during the first time period, and generates a second offer for the first consumer such that: if the first consumer purchased the first product at the first price during the first time period, the second offer offers the first product for purchase by the first consumer at a second price for a second time period, wherein the second price is greater than or equal to the first price, and, if the first consumer did not purchase the first product at the first price during the first time period, the second offer offers the first item at a third price for a third time period, wherein the third price is less than the first price. In accordance with the embodiment of the present invention, the generation of offers is controlled using a state machine.

According to another embodiment of the present invention, techniques are provided for making offers to consumers for a plurality of products sold by a seller. This embodiment of the present invention receives information identifying a plurality of consumers. The embodiment also receives purchase history information for the plurality of consumers which comprises information related to purchases made by the plurality of consumers. The present invention identifies a first consumer from the plurality of consumers based upon the purchase history information and the information identifying the plurality of consumers. In accordance with the present invention, a first offer is generated for the first consumer and provided to the first consumer. The first offer offers a product from the plurality of products for purchase by the first consumer for a first time period, wherein sale of the product offered by the first offer provides a first profit margin for the seller. The present invention determines if the first consumer purchased the product offered by the first offer during the first time period. If the first consumer purchased the product offered by the first offer during the first time period, a second offer is generated offering a product from the plurality of products for purchase by the first consumer for a second time period, wherein sale of the product offered by the second offer provides a second profit margin for the seller which is greater than the first profit margin. If the first consumer did not purchase the product offered by the first offer during the first time period, a third offer is generated offering a product from the plurality of products for purchase by the first consumer for a third time period, wherein sale of the product offered by the third offer provides a third profit margin for the seller which is less than the first profit margin. In accordance with the embodiment of the present invention, the generation of offers is controlled using a state machine.

According to yet another embodiment of the present invention, techniques are provided for making offers to consumers for a plurality of products sold by a seller. This embodiment of the present invention receives information identifying a plurality of consumers. The embodiment also receives purchase history information for the plurality of consumers which comprises information related to purchases made by the plurality of consumers. The present invention identifies a first consumer from the plurality of consumers based upon the purchase history information and the information identifying the plurality of consumers. The embodiment of the present invention also receives a first threshold "M", (where "M"$\geq$1) and a second threshold "N" (where "N"$\geq$1 and "N"$\leq$"M"). In accordance with the present invention, a first offer is generated for the first consumer which offers a product from the plurality of products for purchase by the first consumer for a first time period, wherein sale of the product offered by the first offer provides a first profit margin for the seller. The embodiment of the present invention repeatedly offers the first offer to the first consumer, and determines if the first consumer purchased the product offered by the first offer during the first time period until the first consumer has purchased the product offered by the first offer at least "N" times or until the first offer has been offered to the first consumer "M" times. If the first consumer purchased the product offered by the first offer "N" times, a second offer is generated offering a product from the plurality of products for purchase by the first consumer for a second time period, wherein sale of the product offered by the second offer provides a second profit margin for the seller which is greater than the first profit margin. If the first consumer did not purchase the product offered by the first offer at least "N" times and the first offer has been offered to the first consumer "M" times, a third offer is generated offering a product from the plurality of products for purchase by the first consumer for a third time period, wherein sale of the product offered by the third offer provides a third profit margin for the seller which is less than the first profit margin. In accordance with the embodiment of the present invention, the generation of offers is controlled using a state machine.

According to another embodiment of the present invention, a system is provided comprising a communication network, a plurality of point-of-sale (POS) systems coupled to the communication network, an offer-generation-system coupled to the communication network, and a plurality of distribution channels. In this embodiment, at least one POS system from the plurality of POS systems is configured to transmit information identifying a plurality of consumers to the offer-generation-system, and transmit purchase history information for the plurality of consumers to the offer-generation-system, the purchase history information comprising information related to purchases made by the plurality of consumers. The offer-generation-system is configured to identify a first consumer from the plurality of consumers based upon the purchase history information and the information identifying the plurality of consumers, generate a first offer offering a product from the plurality of products for purchase by the first consumer, wherein sale of the product offered by the first offer provides a first profit margin for the seller, receive a first threshold "M" (where "M"$\geq$1), receive a second threshold "N" (where "N"$\geq$1 and "N"$\leq$"M"). The offer-generation system is further configured to repeatedly provide the first offer to the distribution channel which is configured to advertise the first offer to the first consumer and to determine if the first consumer purchased the product offered by the first offer during the first time period until the first consumer has purchased the product offered by the first offer at least "N" times or until the first offer has been offered to the first consumer "M" times. If the first consumer purchased the product offered by the first offer "N" times, the offer-generation-system is configured to generate a second offer offering a product from the plurality of products for purchase by the first consumer for a second time period, wherein sale of the product offered by the second offer provides a second profit margin for the seller which is greater than the first profit margin. If the first consumer did not purchase the product offered by the first offer at least "N" times and the first offer has been offered to the first consumer "M" times, the offer-generation-system is configured to generate a third offer offering a product from the plurality of products for purchase by the first consumer for a third time period, wherein sale of the product offered by the third offer provides a third profit margin for the seller which is less than the first profit margin.

According to another embodiment of the present techniques are provided for making offers to consumers for a plurality of products sold by a seller. This embodiment of the present invention identifies a first consumer from a plurality of consumers. A state machine comprising a plurality of states is provided to control generation of offers. The present invention generates a first offer corresponding to a first state of the state machine, the first offer offering a product from the plurality of products for purchase by the first consumer for a first time period. The present invention then determines if the first consumer purchased the product offered by the first offer during the first time period. If the first consumer purchased the product offered by the first offer during the first time period, the present invention transitions from the first state to a second state of the state machine based on first marketing criteria associated with the first state, and generates a second offer associated with the second state, the second offer offering a product from the plurality of products for purchase by the first consumer. If the first consumer did not purchase the product offered by the first offer during the first time period, the present invention may be configured to transition from the first state to a third state of the state machine based on second marketing criteria associated with the first state, and generate a third offer associated with the third state, the third offer offering a product from the plurality of products for purchase by the first consumer.

The foregoing, together with other features, embodiments, and advantages of the present invention, will become more apparent when referring to the following specification, claims, and accompanying drawings.

BRIEF DESCRIPTION OF THE DRAWINGS

FIG. 6 depicts a graphical user interface for configuring incented products according to an embodiment of the present invention;

DESCRIPTION OF THE SPECIFIC EMBODIMENTS

The present invention pertains to techniques for generating and making incentive offers and promotions to consumers to influence the consumers' purchasing behavior. According to the teachings of the present invention, the offers are customized for each individual consumer based on the particular consumer's purchase history information (or shopping history) and the consumer's response to the offers. In this manner, the present invention achieves highly personalized and true one-to-one marketing targeted for an individual consumer.

Figure 1:
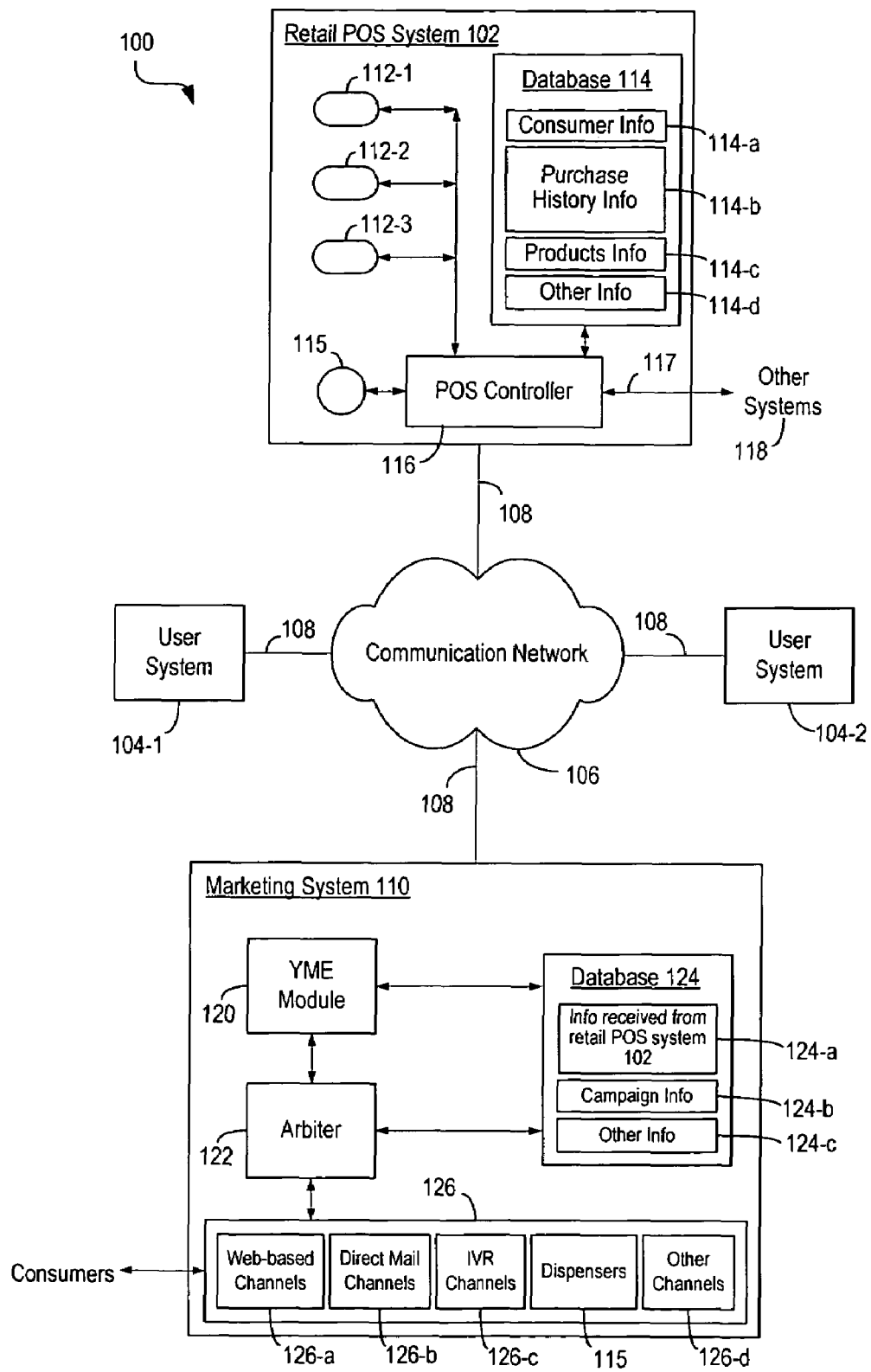
FIG. 1 is a simplified block diagram of a distributed system which may incorporate an embodiment of the present invention.

FIG. 1 is a simplified block diagram of a distributed system 100 which may incorporate an embodiment of the present invention. Computer network 100 may include at least one retail point-of-sale (POS) system 102, one or more user computer systems 104-1 and 104-2, and a marketing system 110 coupled to a communication network 106 via a plurality of communication links 108. Distributed system 100 depicted in FIG. 1 is merely illustrative of an embodiment incorporating the present invention and does not limit the scope of the invention as recited in the claims. One of ordinary skill in the art would recognize other variations, modifications, and alternatives. For example, more than one retail POS system 102 may be coupled to communication network 106.

Communication network 106 provides a mechanism for allowing the various components of distributed network 100 to communicate and exchange information with each other. Communication network 106 may itself be comprised of many interconnected computer systems and communication links. Communication links 108 may be hardwire links, optical links, satellite or other wireless communications links, wave propagation links, or any other mechanisms for communication of information. While in one embodiment communication network 106 is the Internet, in other embodiments, communication network 106 may be any suitable computer network.

Retail POS system 102 may be implemented in one or more retail stores where a consumer may purchase products, including goods and services. Systems such as retail POS system 102 are widely used in retail stores to record purchase transactions. Retail POS systems may have varying levels of complexity and local storage capacity. The main purpose of these systems is to enable recording of data related to purchase transactions that are consummated at the retail store (or stores) where the retail POS system is deployed. As shown in FIG. 1, retail POS system 102 may comprise a POS controller system 116 coupled to one or more checkout terminals 112, a POS database 114, and one or more dispensers 115. According to an embodiment of the present invention, POS controller system 116 may also be coupled to other systems 118 via communication link 117. Other systems 118 may include other retail POS systems, systems of manufacturers, other databases or information stores, and other systems.

Checkout terminals 112 are configured to record purchase transactions that take place at the retail store. Each checkout terminal 112 may be coupled to a scanner (not shown) which may be used to identify each purchased product. For example, the scanner may be used to scan a Universal Product Code (UPC) associated with a purchased product. The UPC code may be used to determine the identity of the purchased product, information related to the manufacturer of the purchased product, the price of the purchased product, and various other characteristics of the purchased product. In general, use of the term "product" is intended to include all possible types of goods, items, articles, services, merchandise, supplies, commodities, and the like.

According to an embodiment of the present invention, scanners coupled to checkout terminals 112 may also be used to scan loyalty cards of consumers purchasing the products. Loyalty cards may be assigned by the retail store to each consumer to uniquely identify the consumer, e.g. each loyalty card generally contains an identification code which uniquely identifies the consumer to whom the loyalty card is assigned. At checkout time, the loyalty card may get scanned to uniquely identify the consumer making the purchase. The purchases made by the consumer may then be associated with the consumer and stored as the consumer's purchase history information. Consumer identification information along with information identifying items purchased by the consumer may be forwarded by checkout terminals 112 to POS controller 116 which may store the information in database 114.

According to an embodiment of the present invention, one or more consumer identification codes (or loyalty card ids) may also be logically linked to form groups or "households." Each group or household may be identified by a unique household identification code. A mapping of consumer identification codes to household identification codes and vice versa may be stored in database 114. For example, a husband and wife may each be assigned unique consumer identification codes, and may also be logically linked together via a household identification code. The consumer identification code to household identification code mapping information may be used to determine the household to which the husband or wife belong. In alternative embodiments, members of a household may be assigned the same consumer identification code which may also serve as the household identification code.

According to an embodiment of the present invention, information identifying members to be included in a household may be provided by a consumer when the consumer applies for a loyalty card. It should however be apparent that consumers may request to be grouped together to form a household even after the loyalty cards have been assigned. For example, a first consumer who has been assigned a consumer identification code may request to be logically linked to a second consumer who has already been assigned a consumer identification code. The first consumer may or may not know the identity of the second consumer. According to an embodiment of the present invention, the first consumer may be provided a list of consumer identification codes assigned by the retail store to other to be linked with the first consumer's identification code. The identities of the other consumers associated with the identification codes provided by the first consumer need not be known to the retailer (the retailer may also not know the identity of the first consumer—the retailer may only know the identification code). In alternate embodiments, the present invention may link the first consumer with a second consumer identification code based on the first and second consumer's shopping patterns or information explicitly provided by the consumer such as address or phone number. Other techniques known to those of ordinary skill in the art may also be used to group consumers.

Database 114 may be configured to store information related to the operations performed by retail POS system 102. Database 114 may store consumer information 114-*a* which may include information identifying individual consumers and/or households, information related to consumers such as a consumer's mailing address, an electronic mail (email) address for the consumer, other contact information related to the consumer, demographic information about the consumer, and other like information. This information may be provided by the consumer, for example, when applying for a loyalty card. Purchase history information 114-*b* for each consumer (or household) accumulated over a period of time may also be stored in database 114. Database 114 may also store information 114-*c* related to products sold by the retail store. In accordance with the present invention, database 114 may also store other information 114-*d* which may include information received from marketing system 110, information related to offers generated by marketing system 110, etc.

POS controller 116 is generally a data processing computer system which is responsible for performing processing to facilitate the operation of retail POS system 102. The functions performed by POS controller 116 may be performed by a single computer system or a plurality of computer systems. POS controller 116 may control the storage of information in database 114 and regulate access to the stored information. According to an embodiment of the present invention, POS controller 116 may be configured to facilitate communication of information from and to retail POS system 102. According to an embodiment of the present invention, POS controller 116 may be coupled to other systems 118 via communication link 117. These systems may include POS controllers from other retail POS systems, other databases, etc. The databases may include a global consumer purchase history database which may store purchase history information captured by a plurality of retail POS systems. POS controller 116 may also be configured to upload purchase history information 114-*b* stored in database 114 to the global consumer purchase transaction history database on a periodic basis. POS controller 116 may also download information from the global consumer purchase transaction history database on a periodic basis. POS controller 116 may also be configured to control the operation of dispensers 115 which may be used to print coupons for consumers.

Referring back to FIG. 1, user systems 104 allow users of the present invention to interact with marketing system 110. These users may include one or more human beings interacting with a user system 104, one or more processes executing on user system 104, or other entities capable of interacting with marketing system 110. Various different types of interactions with marketing system 110 may be facilitated by user systems 104. These interactions may be facilitated by software applications executing on user system 104 or executing on marketing system 110, and/or hardware modules coupled to user system 104 or marketing system 110. According to an embodiment of the present invention, users may interact with marketing system 110 via a browser program executing on user system 104. For example, the browser program may be used to access web pages provided by marketing system 110. Examples of browser programs include the Internet Explorer browser program provided by Microsoft Corporation, the Netscape Navigator browser provided by AOL Corporation, and others. Other application programs executed by user system 104 may also facilitate interactions with marketing system 110.

According to an embodiment of the present invention, users may utilize user systems 104 to configure rules and logic which control the offer generation process. In accordance with the present invention, users may configure "campaigns" which are a set of rules which control the generation and distribution of offers to consumers during a specified time period. Users who configure campaigns may be referred to as "campaign designers" or "campaign writers." Using graphical user interfaces (GUIs) displayed on user system 104, campaign designers may create new campaigns, edit existing campaigns, and perform other operations related to campaigns. Campaign designers may also simulate or install campaigns using user systems 104. After a campaign has been installed, users may monitor the state of the campaign via user system 104. According to an embodiment of the present invention, users may also use user systems 104 to access information stored by retail POS system 102 or marketing system 110.

According to the teachings of the present invention, marketing system 110 may be configured to perform processing to facilitate generation and distribution of offers based upon consumers' purchase history and upon campaign information (or business rules and logic) provided by campaign designers.

Marketing system 110 may be embodied in a single computer system or may comprise a plurality of interconnected computer systems and communication links. In addition to generating and distributing offers to consumers, marketing system 110 may also be configured to provide services for creating campaigns, editing campaigns, simulating campaigns, installing campaigns, and performing other functions related to campaigns and the offer generation and distribution process in general.

According to an embodiment of the present invention, marketing system 110 may be configured to receive consumer purchase history information from retail POS system 102 and to distill information from the purchase history information which is needed for generating and distributing offers. Processes or programs or modules executing on marketing system 110 may automatically monitor a particular consumer's purchase activity such that generation of offers is based on up-to-date information about the consumer. Marketing system 110 may also be configured to select offers to be presented to the consumer and to determine the manner in which the offers will be presented to the consumer. In accordance with the present invention, marketing system 110 may be configured to monitor a consumer's response to offers made to the consumer and to generate new offers based on the consumer's response(s). Functions performed by marketing system 110 may be performed by software code modules (programs or processes) executed by marketing system 110, hardware modules of marketing system 110, or combinations thereof.

As shown in FIG. 1, marketing system 110 may comprise a yield management engine (YME) module 120, an arbiter module 122, a distribution channels module 126, and other modules (not shown). These modules may be implemented in hardware or software of combinations thereof. For example, YME module 120 may be a program or process executed by marketing system 110. Marketing system 110 depicted in FIG. 1 is merely illustrative of an embodiment incorporating the present invention and does not limit the scope of the invention as recited in the claims. One of ordinary skill in the art would recognize other variations, modifications, and alternatives. For example, alternative embodiments of marketing system 110 may include more or fewer modules than those shown in FIG. 1. Further, one or more modules may be combined into a single module, or alternatively, a single module may be subdivided into multiple modules. For example, in alternative embodiments of the present invention, functions performed by YME module 120 may be performed by a plurality of different modules. Further, in alternative embodiments, the functions performed by YME module 120 and arbiter module 122 may be performed by a single module. In yet other embodiments of the present invention, marketing system 110 may comprise only YME module 120 and the other modules may be executed by other systems coupled to marketing system 110.

YME module 120 may be configured to automatically monitor consumer purchase activity and to generate offers based upon the monitored consumer purchase history information. YME module 120 may also provide services for creating campaigns, editing campaigns, simulating campaigns, installing/activating campaigns, and other services related to generation and distribution of offers. YME module 120 may receive consumer identification information and purchase history information from retail POS system 102. As previously indicated, the purchase history information may comprise information related to purchases made by the consumers. The consumer identification information may comprise information which identifies the consumers and/or households. YME module 120 may be configured to distill information for generating offers from the information received from retail POS system 102. YME module 120 may periodically monitor consumers' purchase activity such that generation of offers is based on up-to-date information about the consumers.

In accordance with the present invention, YME module 120 may generate offers on a per consumer basis. YME module 120 may identify a consumer based solely upon the consumer identification code which may anonymously identify a consumer. Unlike conventional marketing systems, the present invention does not require any personal or demographic information about consumers to generate offers. According to the present invention, offers are made based on what the consumer purchases and not based on who the consumers is—YME module 120 identifies consumers based on their consumer identification codes and does not need to know the specific identify of the consumers for generation of offers. In embodiments where consumer identification codes are linked together by a household identification code, the offers may be generated on a per household basis based upon the household identification code. In this embodiment, a mapping of consumer identification codes to household identification codes and vice versa may be received from retail POS system 102 and stored in database 124. YME module 120 may use the mapping information to determine the household for which offers are to be generated. Alternatively, the consumer identification code to household identification code mapping may be performed by retail POS system 102 and the household identification code may then be forwarded to YME module 120 for purposes of generating offers. Further details related to functions performed by YME module 120 to facilitate generation of offers are provided below.

The set of offers generated by YME module 120 for a consumer may be forwarded to arbiter 122 which determines which offers from the set of generated offers are to be distributed or advertised to the consumer. Arbiter 122 may also determine the distribution/advertisement channels 126 to be used for distributing the selected offers to the consumers. Each consumer as identified by the consumer identification code (or each household as identified by the household identification code) is processed one-by-one by arbiter 122. For each consumer, arbiter 122 may expire old offers and select new offers to distribute to the consumer. Generally, arbiter 122 selects sufficient offers to make efficient use of the distribution channels. Arbiter 122 may also prioritize offers such that offers with higher priorities are selected before offers with lower priorities. Further details related to functions performed by arbiter 122 are provided below.

Several different distribution/advertisement channels 126 may be used to distribute/advertise offers to consumers. These may include web-based channels 126-a, direct mail channels 126-b, interactive voice recognition (IVR) systems 126-c, and others 126-d. Dispensers 115 located at retail stores may also be used as distribution channels to provide offers to consumers. Others 126-d may include cash register receipts given by the POS. For example, offers may be printed on the cash register receipts printed by the POS. Since offers are customized on a per consumer (or per household) basis, an offer is distributed or made accessible only to the consumer for whom the offer is customized. In this manner, the present invention achieves actual one-to-one marketing of offers.

Using web-based channels 126-a, electronic messages e.g. emails containing information describing the offers may be sent to email addresses of consumers for whom the offers have been generated. Offers may also be posted on web pages which may be accessed by the consumers for whom the offers are made. Using direct mail channels 126-*b,* printed material corresponding to the offers may be mailed to the postal addresses of the consumers. Using IVR systems 126-*c,* voice files describing the offers may be generated and distributed to IVR system vendors. A consumer may then make a phone call to the IVR system vendors and listen to the available offers. Information related to the offers may also be communicated to retail POS system 102 and dispensers 115 may be used to provide the offers to the targeted consumers. Several other techniques may also be used to distribute/advertise offers to the targeted consumers.

Pending offers may simply be displayed to the consumer, with no consumer selection of the offers being required, or offers could be selected by the consumer. Consumers may also be provided the ability to extend the expiration date of pre-selected offers. This provides an incentive for consumers to visit the advertising/distribution channels so that they might extend offers which would otherwise expire soon, thus making a future shopping trip more valuable.

Database 124 may be configured to store information related to processing performed by marketing system 110. This may include information used or generated by YME module 120, arbiter 122, distribution channels 126, and other information. Information 124-*a* received from retail POS system 102 may also be stored in database 124. Information 124-*a* may include consumer identification information, purchase history information, product information, and the like information received from retail POS system 102. Information 124-*c* related to campaigns configured by campaign designers may also be stored in database 124. Database 124 may also store other information 124-*c* related to processing performed by marketing system 110.

Figure 2:
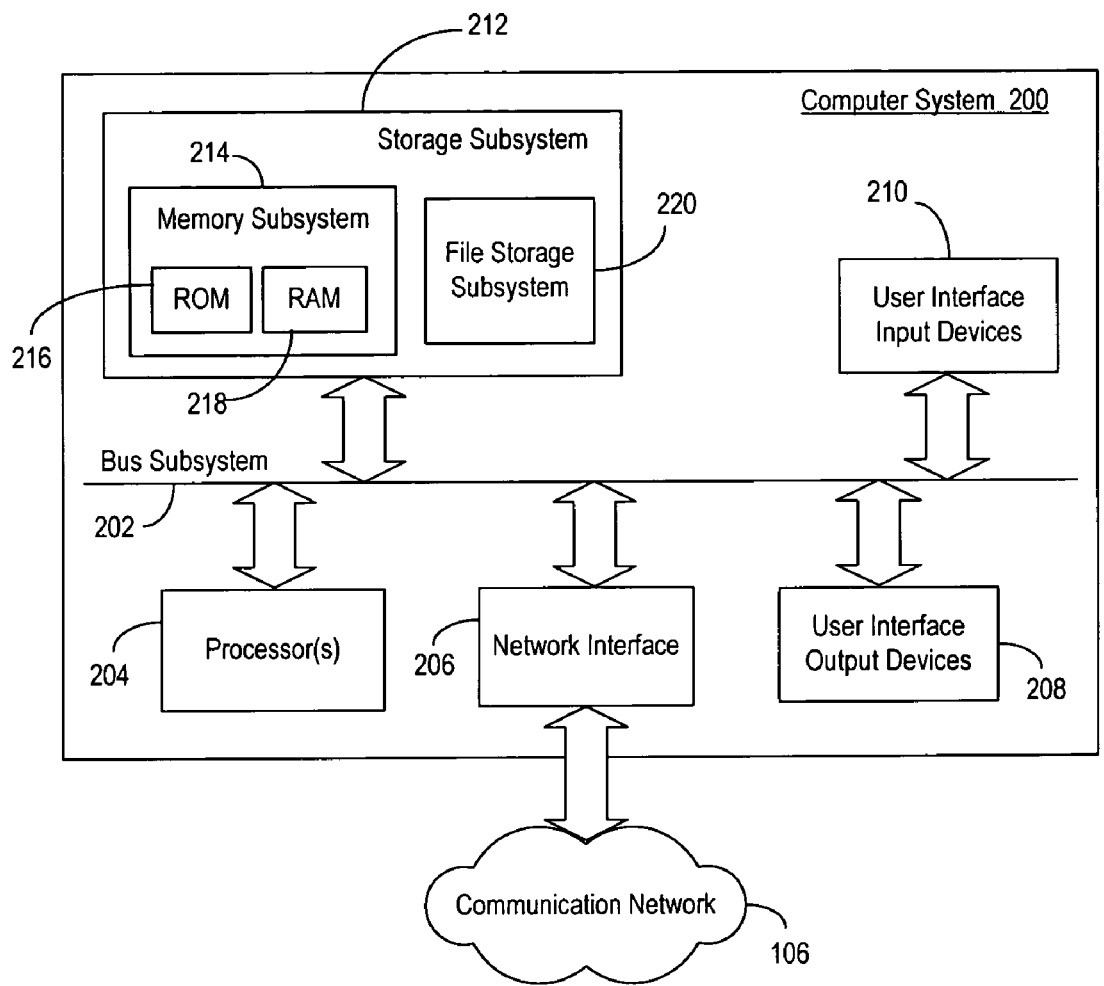
FIG. 2 is a simplified block diagram of an exemplary computer system according to an embodiment of the present invention.

FIG. 2 is a simplified block diagram of an exemplary computer system 200 according to an embodiment of the present invention. Computer system 200 may used as POS controller 116, as user system 104, as marketing system 110, or as one of the computer systems which make up marketing system 110, or other like system. Computer system 200 typically includes at least one processor 204, which communicates with a number of peripheral devices via bus subsystem 202. These peripheral devices typically include a storage subsystem 212, comprising a memory subsystem 214 and a file storage subsystem 220, user interface input devices 210, user interface output devices 208, and a network interface subsystem 206. The input and output devices allow user interaction with computer system 200. It should be apparent that the user may be a human user, a device, a process, another computer, and the like. Network interface subsystem 206 provides an interface to outside networks, including an interface to communication network 106, and may be coupled via communication network 106 to corresponding interface devices in other computer systems.

User interface input devices 210 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 200 or onto communication network 106.

User interface output devices 208 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200 to a user or to another machine or computer system.

Storage subsystem 212 may store the basic programming and data constructs that provide the functionality of computer system 200. For example, the various modules implementing the functionality of the present invention may be stored in storage subsystem 212. These software modules are generally executed by processor(s) 204. In a distributed environment, the software modules may be stored on a plurality of computer systems and executed by processors of the plurality of computer systems. Storage subsystem 212 also provides a repository for storing the various databases storing information according to the present invention. Storage subsystem 212 typically comprises memory subsystem 214 and file storage subsystem 220.

Memory subsystem 214 typically includes a number of memories including a main random access memory (RAM) 218 for storage of instructions and data during program execution and a read only memory (ROM) 216 in which fixed instructions are stored. File storage subsystem 220 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 106. Information stored according to the teachings of the present invention may also be stored by file storage subsystem 220.

Bus subsystem 202 provides a mechanism for letting the various components and subsystems of computer system 200 communicate with each other as intended. The various subsystems and components of computer system 200 need not be at the same physical location but may be distributed at various locations within distributed system 100. Although bus subsystem 202 is shown schematically as a single bus, alternative embodiments of the bus subsystem may utilize multiple busses.

Computer system 200 itself can be of varying types including a personal computer, a portable computer, a workstation, a computer terminal, a network computer, a mainframe, or any other data processing system. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2.

Figure 3:
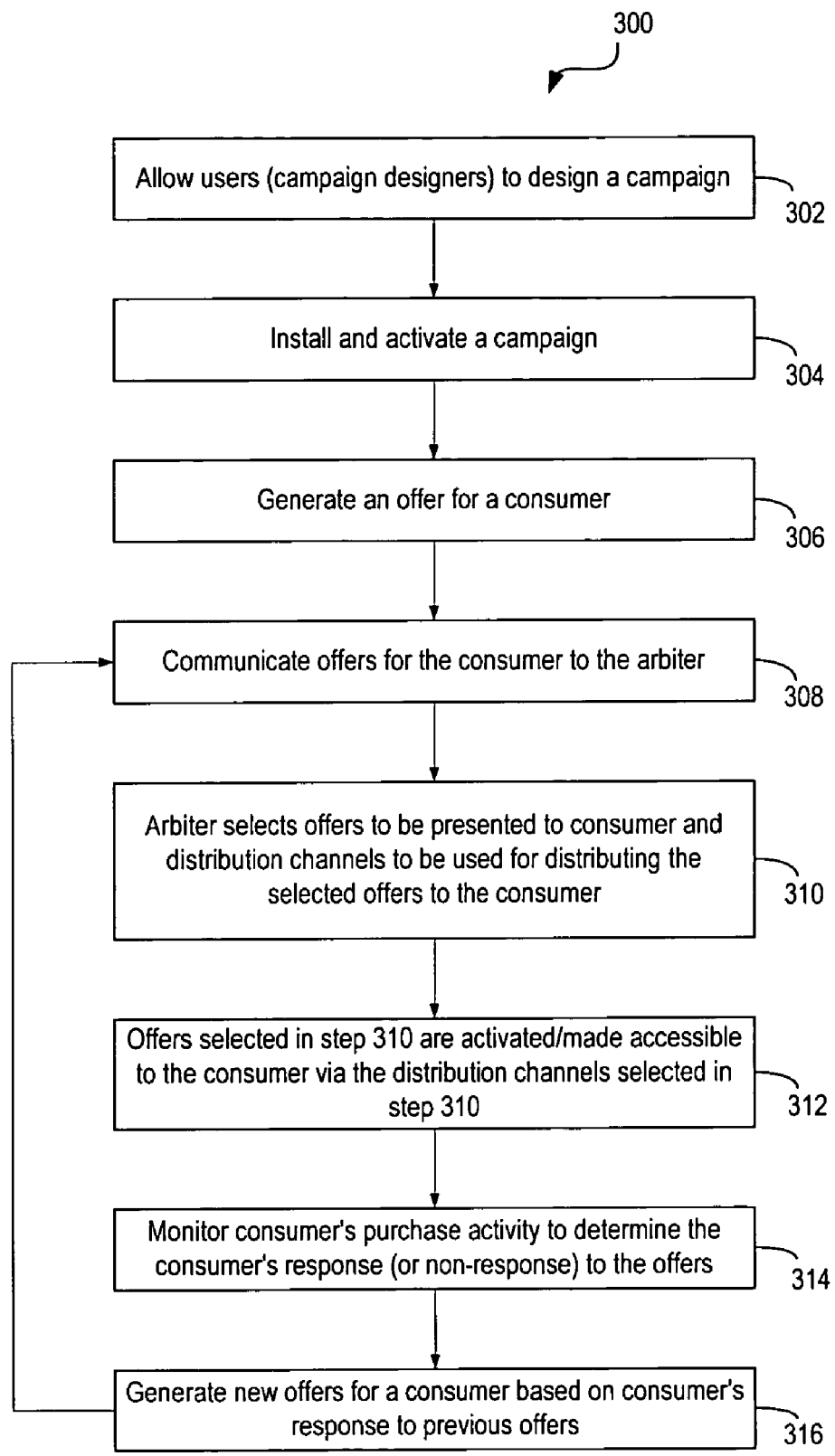
FIG. 3 is a simplified high-level flowchart showing processing performed by the marketing system for generating and distributing offers to individual consumers according to an embodiment of the present invention.

FIG. 3 is a simplified high-level flowchart 300 showing processing performed by marketing system 110 for generating and distributing offers to individual consumers according to an embodiment of the present invention. As shown in FIG. 3, the present invention allows users to design campaigns which control the generation of offers to consumers (step 302). A campaign is a set of rules about offers to be presented to a consumer during a specified time period. Accordingly, a user of the present invention may use campaigns to control and identify the set of consumers for receiving offers, products and corresponding prices to be included in the offers to the consumers, the conditions under which the offers are to be presented to the users, the duration of the offers, and other criteria related to generation and distribution of offers. Various techniques such as decision trees, tactics, and state machines may be used to implement the rules and logic for a campaign. Further information about decision trees, tactics, and state machines is provided below.

Campaigns provide a convenient interface for users of the present invention, such as retailers and manufacturers, to implement their business rules in a simple and efficient manner. According to an embodiment of the present invention, details related to a campaign may be stored in a file in database 124. As a result of their persistent nature, campaigns are reusable. This is substantially different from conventional marketing techniques which are based upon ad hoc queries directed towards consumer databases. The queries are generally non-persistent in nature and thus cannot be reused.

Marketing system 110 may provide various tools for configuring and maintaining campaigns. These tools may be executed by marketing system 110 or may alternatively be executed by user systems 104. For example, various GUIs may be provided which allow campaign designers to configure new campaigns and/or edit existing/pre-configured campaigns. Examples of GUIs for designing campaigns according to an embodiment of the present invention are described below. A plurality of campaigns may be designed by users of the present invention.

After a campaign has been designed, the campaign may be installed and/or activated (step 304). In accordance with the present invention, one or more campaigns may be installed and activated concurrently. According to an embodiment of the present invention, "installing" a campaign causes YME module 120 to execute one or more processes which automatically monitor consumer purchase activity based upon the consumer purchase history information. Activation of the campaign causes YME module 120 to start generating offers to specific consumers according to business and logic rules of the campaign designed by the campaign designer. Users may also simulate campaigns (not shown in FIG. 3) using marketing system 110. Simulation of a campaign allows the campaign designer to determine the effectiveness and efficacy of the campaign before applying the campaign to actual consumers.

Depending on the purchase behavior of a consumer and based upon the rules associated with the campaign, YME module 120 may then generate an offer for a particular consumer (step 306). YME module 120 may execute several programs concurrently which each make offers to consumers. YME module 120 may use various decision trees, tactics, and tactic state machines to generate the offers. Further details related to decision trees, tactics, and tactic state machines are provided below. Each offer may include one or more products and prices at which a consumer may purchase the one or more products. An expiry time may be associated with each offer. The products are generally identified by an advertised product name such as "Brand X Dog Food." The prices may be specified using several different pricing schemes. Examples of pricing schemes may include (a) a net price for a product (e.g. "Cookies at $1.29 each"), (b) a K-for-N scheme (e.g. "4 cookies for $4.00"), (c) a buy-K-get-N scheme (e.g. "Buy three cookies and get one cookie free"), (d) an amount off scheme (e.g. "Cookies at $1.00 off the list price"), (e) a percent off scheme (e.g. Cookies at 50% off the list price), and others. Conditions such as a limit on the number of products which can be purchased based upon a particular offer may also be included in the offer, e.g. "Cookies at $1.29 each, limit 4 per consumer" or "Cookies at $1.29 each, limit 4 per visit."

YME module 120 may also associate priorities with offers. These priorities influence the manner in which arbiter 122 selects offers to be distributed/advertised to the consumer. For example, a priority value ("special" priority) may be associated with an offer instructing arbiter 122 to always select the offer. Priorities may also be assigned according to a sliding rule scale, such that offers with higher priorities assigned to them are more likely to be selected than offers with lower priorities associated with them. Further, multiple priorities of different types may be assigned to the same offer or may be used to determine the priority for the offer.

According to an embodiment of the present invention, an incented-product priority value, a tactic priority value, and a depth of discount priority value may be assigned to an offer and may be used to calculate the composite priority (may be calculated by arbiter 122) for the offer. For example, the following formula may be used to determine the offer priority:

incented-product priority+tactic priority+(% discount)/10=offer priority

In addition to the priority information, other information related to the product, such as the type of product, may also be used by arbiter 122 in the offer selection process. For example, within the top priority set, perhaps only a few "high visibility" products could be selected, so that some lower priority products with less brand visibility might be included in the selected set of offers which arbiter 122 deems desirable to display to the consumer. The set of offers not chosen by arbiter 122 may be relayed back to YME module 120 so that these offers are not enabled at the POS. Further details related to selection of offers by arbiter 122 are provided below.

Referring back to FIG. 3, after YME module 120 has generated the offers, the offers are communicated to arbiter 122 (step 308). Arbiter 122 then selects one or more offers, from the set of offers generated by YME module 120, to be presented to the consumer and the distribution channels to be used for distributing/advertising the selected offers to the consumers (step 310). According to an embodiment of the present invention, arbiter 122 selects offers on a per-consumer (or per household) basis. For each consumer, the selection is performed on a per-distribution channel basis. For each distribution channel, arbiter 122 selects only those offers that can be suitably displayed/communicated by the particular distribution channel. For example, before an offer is selected to be communicated via IVR systems 126-*c*, arbiter 122 verifies that the a pre-recorded voice file explaining the offer is available to be distributed via IVR systems 126-*c*. Offers to be distributed via web-based channels 126-*a* may require that the offer be formatted as an electronic message or be stored as a web page which can be accessed by the targeted consumer. Since offers distributed via direct mail channel 126-*b* require a lead delivery time for the offers to be actually delivered to the consumers, arbiter 122 may be configured to select only those offers for distribution via the direct mail channel which do not expire for a specified minimum amount of time beyond the expected delivery time of the offer. A campaign designer may customize the minimum and/or the maximum number of offers that may be presented to a consumer via a particular channel. This type of customization information is usually included in the campaign-related information which may be stored in database 124 from where it can be accessed by arbiter 122. For each channel, arbiter 122 deactivates pending offers which have expired and activates new offers to fill the channel.

Figure 4:
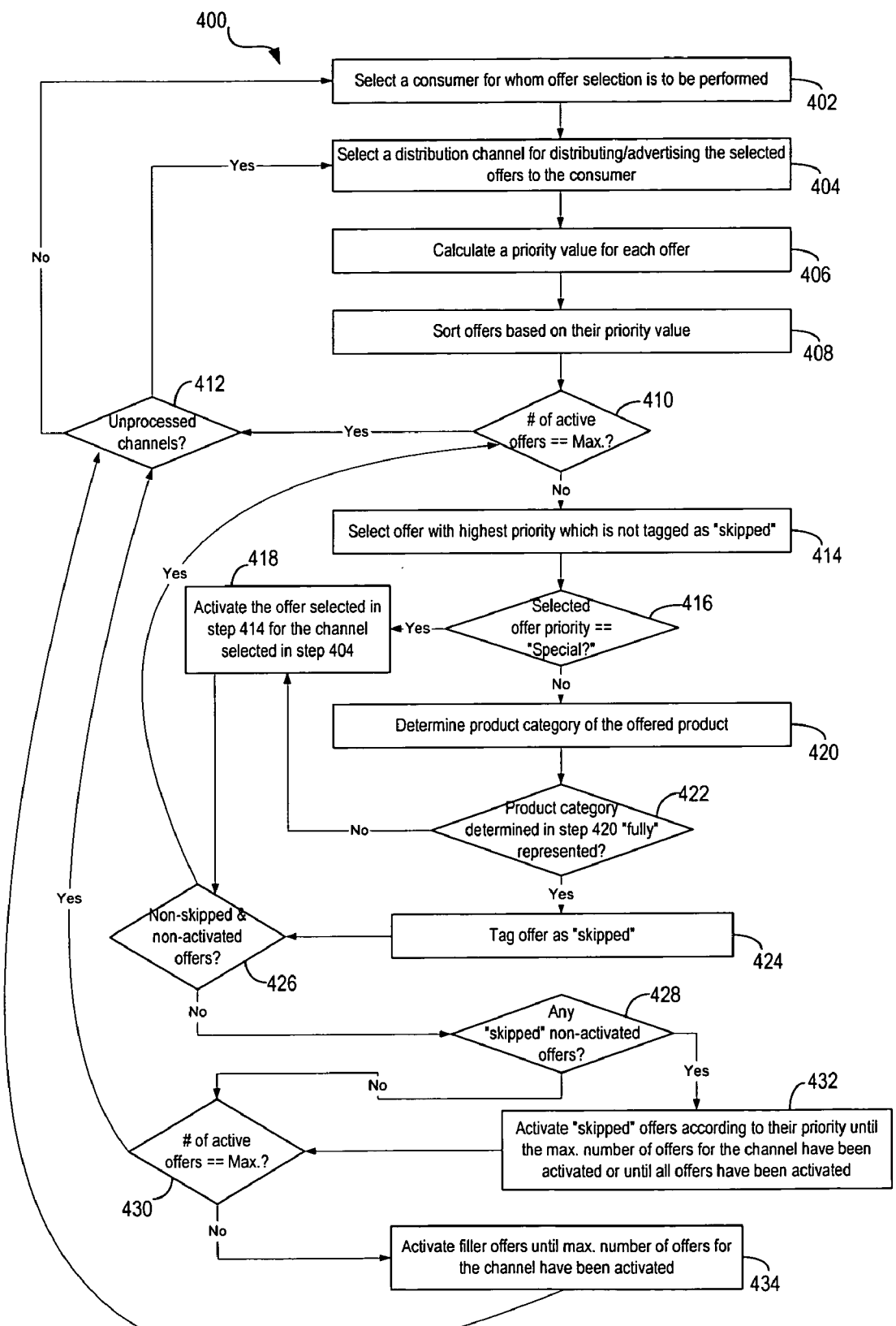
FIG. 4 is a simplified high-level flowchart showing processing performed by the arbiter for selecting offers to be distributed/advertised to a consumer according to an embodiment of the present invention.

Arbiter 122 may use various criteria to decide which offers, from the offers generated by YME module 120, are to be presented to the consumer. FIG. 4 is a simplified flowchart 400 showing processing performed by arbiter 122 for selecting offers to be distributed/advertised to a consumer according to an embodiment of the present invention. As shown in FIG. 4 processing is initiated when arbiter 122 selects a consumer for whom offer selection is to be performed (step 402). Arbiter 122 then selects a distribution channel which is to be used for distributing offers targeted to the consumer selected in step 402 (step 404). Arbiter 122 then calculates/determines a priority value for each offer for the consumer to be distributed via the channel selected in step 404 (step 406). According to an embodiment of the present invention, the priority value for an offer calculated in step 406 may be a composite priority value based on the one or more priority values (e.g. a combination of the incented-product priority value, the tactic priority value, and the depth of discount priority value, a shown above) assigned to each offer by YME module 120. Various different techniques and algorithms may be used by arbiter 122 to calculate the composite priority value for each offer to be distributed via the selected channel, as described previously. Composite priority values above a user configurable threshold may be classified as "special" priority values.

Arbiter 122 may then sort the offers based on their priority values (which may be composite values) to generate a sorted list of offers such that offers with higher priorities are placed higher up the list than offers with lower priorities, with offers having "special" priority values being placed at the top of the list (step 408). Arbiter 122 then determines if the number of active offers for the distribution channel selected in step 404 equals the maximum number of active offers for that channel (step 410). As indicated above, the maximum number of active offers for a channel may be configured by the user of the present invention or may alternatively be determined by the nature of the distribution channel.

If the number of active offers is equal to the maximum threshold for the distribution channel, thus indicating that no more offers may be activated using this distribution channel, arbiter 122 then determines if there are any more unprocessed (i.e. distribution channels for which offer selection has not been performed for the consumer selected in step 402) distribution channels (step 412). If all channels for the consumer have been processed, processing proceeds with step 402 wherein arbiter 122 selects the "next" consumer for whom offer selection is to be performed. If unprocessed channels exist for the consumer, arbiter 122 then selects the next unprocessed channel for which offer selection is to be performed according to step 404.

If arbiter 122 determines at step 410, that the maximum threshold of active offers for the selected distribution channel has not been reached, arbiter 122 selects an offer from the sorted list generated in step 408 with the highest priority and which has not been tagged as "skipped" (the "skipped" tag is explained below) (step 414). Arbiter 122 then determines if the priority value associated with the offer selected in step 414 is "special" (step 416). If arbiter 122 determines the priority associated with the offer to be "special," arbiter 122 activates that offer selected in step 414 for the channel selected in step 404 (step 418). Arbiter 122 then determines if any offers exist in the sorted list which have not been activated and which have not been tagged as "skipped" (step 426). If such offers exist processing continues with step 410, else processing continues with step 428.

If arbiter 122 determines in step 416 that the value associated with the offer is not "special," arbiter 122 then determines the product category of the product incented/offered by the offer (step 420). According to an embodiment of the present invention, the product category for each product may be indicated by a multi-digit category number code value. Arbiter 122 then determines, based upon the category number code value, if the offer's product category has already been "fully" represented by one or more active offers (step 422). A user-configurable threshold value may be associated with each product category indicating the maximum number of active offers for the product category. A product category may be considered "fully" represented (or "full") if the threshold value indicating the maximum number of active offers for the product category has been reached. If arbiter 122 determines that the product category associated with the offer selected in step 414 has not already been fully represented, the offer selected in step 414 is activated (step 418). If arbiter determines in step 422 that the product category has already been fully represented (i.e. the threshold for the product category has been reached), the offer is tagged as "skipped" (step 424) and processing continues with step 426. In this manner arbiter 122 tries to maintain a balance of product categories.

If arbiter 122 determines in step 426 that the sorted list does not contain any non-activated offers which are not tagged as "skipped," arbiter 122 then determines if there are any non-activated offers which are tagged as "skipped" (step 428). If arbiter 122 determines that the sorted list does not contain any non-activated offers that have been tagged as "skipped," processing continues with step 430.

If arbiter 122 determines in step 428 that the sorted list contains non-activated offers which have been tagged as "skipped," arbiter 122 activates the "skipped" offers in descending order based on their priority value (i.e. offers with higher priorities are selected first) until either all "skipped" offers are activated or the maximum number of active offers for the channel has been reached (step 432). Processing then continues with step 430.

In step 430, arbiter 122 determines if the maximum number of active offers for the channel has been reached. If the maximum threshold has been reached, processing continues with step 412. If the maximum number of active offers for the channel has not been reached, it indicates that the channel has spare capacity, and arbiter 122 may activate filler offers to fill the spare capacity (step 434). These fillers offers may include offers which have not been specifically targeted for the particular consumer, default offers generated by marketing system 110, and others. Processing may then continue with step 412.

As indicated above, processing performed by arbiter 122 may be controlled by parameters configurable by the user of the present invention. According to an embodiment of the present invention, these parameters are stored in database 124 and may be edited by the campaign designer. Examples of these parameters include a parameter controlling the maximum number of offers that can be activated for a distribution channel, the threshold value associated with a product category indicating the maximum number of active offers for the product category, and others. As indicated by flowchart 400 in FIG. 4, arbiter 122 is generally configured to activate offers, if possible, for a channel until the maximum threshold for the channel has been reached. If arbiter 122 cannot reach the maximum value using offers targeted for the consumer, other non-targeted filler offers may be used to fill in the empty capacity of the channel.

In alternative embodiments of the present invention, a parameter may also be defined setting the minimum number of offers that may be activated for a particular channel. In this embodiment, arbiter 122 may be configured to activate non-targeted offers for a channel only if the minimum threshold for the channel has not been reached.

Referring back to FIG. 3, the offers selected in step 310 may then be activated or made accessible to the consumer via the distribution channels chosen in step 310 (step 312). As stated above, various distribution/advertisement channels may be used in accordance with the present invention for providing the offers to the consumer. Each distribution channel may have requirements which may need to satisfied before an offer can be activated via that distribution channel. For example, as previously stated, for an offer to be activated for an IVR system, a voice file needs to be created describing the advertised product and the offer details for the advertised product, before the offer may be activated. According to an embodiment of the present invention, the voice file may be created by arbiter 122. According to an embodiment of the present invention, arbiter 122 may include one or more sub-arbiters, each dedicated to a particular distribution channel. In this embodiment, selected offers for a particular distribution channel may be forwarded to the sub-arbiter dedicated to that particular channel. The dedicated sub-arbiter may then process the selected offers to make them suitable for distribution via the particular distribution channel.

For each consumer to whom an offer has been made, the present invention monitors the consumer's purchase activity to determine the consumer's response or non-response to the advertised offer(s) (step 314). Based upon the information determined in step 314 and the consumer's purchase activity in general, the present invention may generate new offers for the consumer (step 316). One or more of the new offers may repeat one or more the previous offers. Processing then may continue with step 308 wherein the new offers are communicated to arbiter 122.

Flowchart 300 depicted in FIG. 3 may be terminated at any point for a variety of reasons. For example, processing of the campaign may be terminated if the time duration of the campaign has expired. The processing may also be terminated if marketing system 110 decides not to make any offers to a consumer, for example, for budgetary reasons, due to rules configured by the campaign designer, etc. The campaign processing may also be terminated upon receiving an instruction/command from the user of the present invention or the campaign designer to stop the campaign. Processing of flowchart 300 may also be terminated for other reasons.

As stated above, a campaign comprises a set of rules about offers to be presented to a consumer during a specified time period. Users of the present invention may use campaigns to control and identify the set of consumers for receiving offers, products and their corresponding prices to be included in the offers to the consumers, the conditions under which the offers are to be made to the consumers, the duration of the offers, and other criteria related to generation and distribution of offers. FIGS. 5, 6, 7, 8, 9, and 12 depict various GUIs which may be used by campaign designers to design campaigns according to an embodiment of the present invention.

Figure 5:
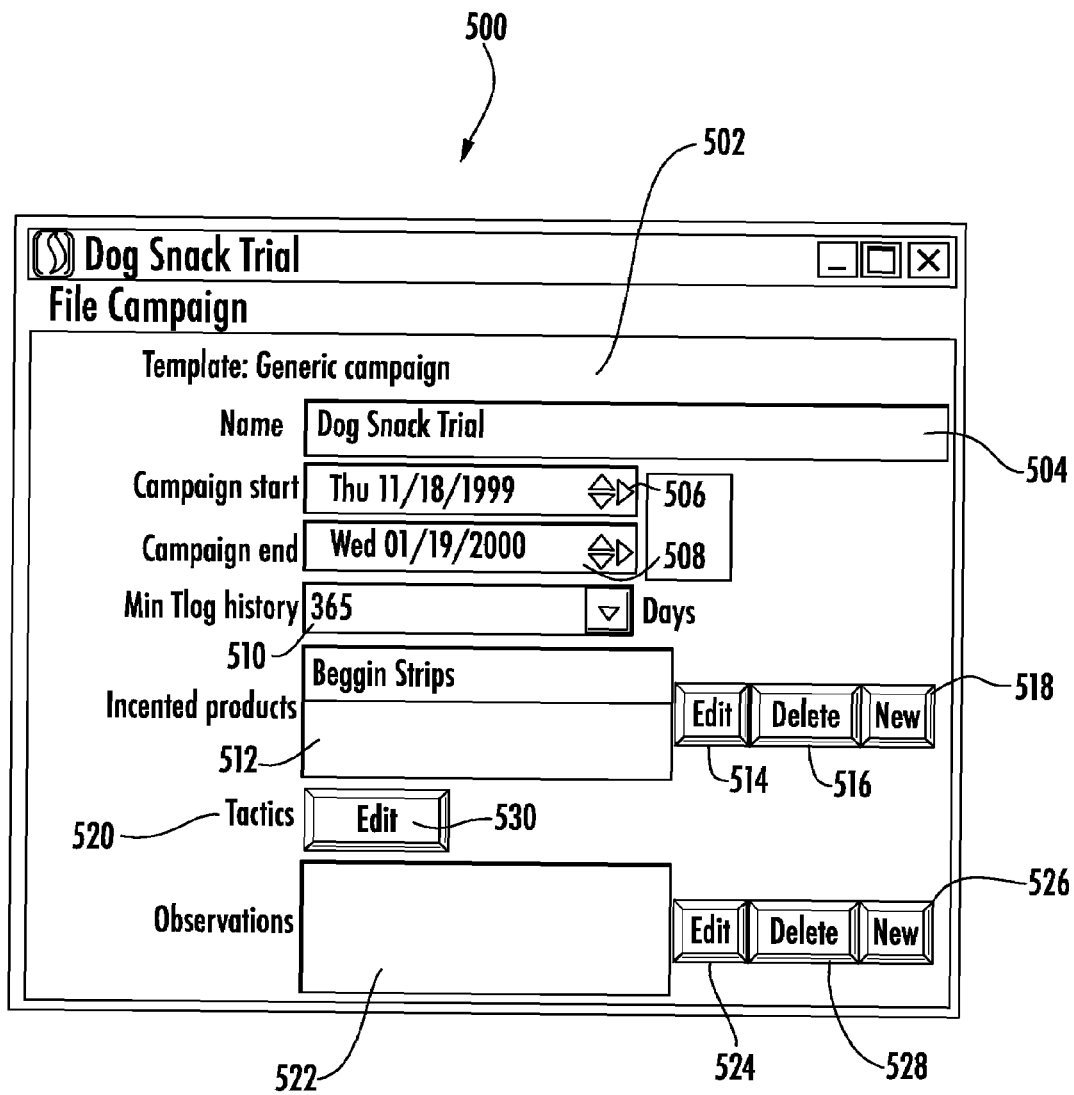
FIG. 5 depicts a high level graphical user interface for configuring a new campaign or for editing an existing campaign according to an embodiment of the present invention.

FIG. 5 shows a high level GUI 500 that may be used to configure a new campaign or to edit an existing campaign according to an embodiment of the present invention. According to an embodiment of the present invention, campaigns may be created using a model template. The name of the template 502 may be displayed by GUI 500. The campaign designer may name the campaign by entering a text string in a name field 504. According to an embodiment of the present invention, the text input by the user in name field 504 may be used to name the file used to store information related to the campaign. The campaign file may be stored in database 124. Each campaign has a start date that can be entered in campaign start field 506, and an end date that can be entered in campaign end field 508.

Offers generated by a campaign are based upon observations made about a consumer's or consumers' purchase history information. These observations may be based on purchase history information received by marketing system 110 from retail POS system 102. A transaction log ("tlog") is usually maintained by retail POS system 102 storing information related to purchases made by consumers at a retail store. For each consumer, the purchase information may include consumer identification information identifying the purchasing consumer, information identifying the products purchased by the consumer, the price at which the products were purchased, the date of the purchase transaction, and other like information. The "tlog" may be stored in database 114 and may be downloaded by POS controller 116 to marketing system 110 on a periodic basis. For example, the download may occur once a day, every hour, continuously, etc. The time period between downloads may be user configurable.

Upon receiving the "tlog" from retail POS system 102, YME module 120 may extract information from the "tlog" and store the extracted information in a "transaction log essence" ("tlog essence") file which may be stored in database 124. The "tlog essence" file effectively reduces the size of the data that needs to be stored by eliminating information that is not needed for the offer generation process and by compressing other information using domain-specific knowledge. For example, the most common "x" number of items purchased by a consumer may be stored in a table and referred to by a small index. Other information related to a consumer such as the offers distributed to the consumer, how the consumer responded to the offers, how the consumer interacts with the distribution channels, and other like information may also be codified in an "alog essence" (advertising log) file that may be processed jointly with the "tlog essence" file.

"Min Tlog history" field 510 allows the user to specify a time period to be used for computing observations for the campaign. For example, as shown in FIG. 5, the most recent 365 days (i.e. one year) of purchase transaction history information will be used for making observations for campaign "Dog Snack Trial."

"Incented Products" field 512 allows users to specify products which are to be incented or included in offers made by the campaign. The campaign designer may also specify parameters to be associated with the incented or offered products which control the manner in which the product may be offered to the consumers. These parameters may include the prices at which the incented products are to be offered, limits on the number of incented products that can be purchased for an offer, etc. Selecting "Edit" button 514 allows a campaign designer to change information about existing incented products. The campaign designer may select "Delete" button 516 to delete pre-existing incented products. The campaign designer may select "New" button 518 to specify new incented products.

FIG. 6 depicts a user interface 600 which may be invoked when "Edit" button 514 or "New" button 518 is selected according to an embodiment of the present invention. If interface 600 is invoked upon selecting "New" button 518, all the fields in GUI 600 are blank and the campaign designer may then enter new values in the fields. If interface 600 is invoked upon selecting "Edit" button 514, the fields in interface 600 display values which were previously configured by the campaign designer and stored in database 124. The campaign designer is then allowed to edit the values.

As shown in FIG. 6, GUI 600 includes a name field 602 wherein a user may enter the name of the product to be incented. The user may also select a product from a pre-configured list of incented products from drop-down list 604 and the corresponding product name is displayed in name field 602. GUI 600 also displays the shelf price 606 and, if available, a club or "bonus" price 608 of the product. The shelf price indicates the price at which the product is sold by the retailer. The club price indicates a special shelf price available to all loyalty cardholders without any additional targeting—merely presenting a unique consumer identifier (e.g. consumer code on a loyalty card) or other identification mechanism entitles the user to the club price. According to an embodiment of the present invention, the present invention takes into account both the club and shelf prices to ensure that an offer better than either the shelf or the club prices is presented to the consumer and that any offer that is not better than the club or shelf prices is rejected. This information may be entered by the campaign designer or alternatively may be automatically displayed based upon product price information stored in database 124.

A campaign designer may also enter the "break even retail" price in field 616. This price reflects the minimum price for which the product may be sold by the retailer without suffering a loss on the transaction. Based on the shelf price, the club price, and the break even retail price, the campaign designer may then define various pricing tiers (three pricing tiers depicted in FIG. 6) for the product, which may be promoted individually to specific consumers. It should be apparent that in alternative embodiments of the present, less than three tiers or more than three tiers of prices may be defined. As shown in FIG. 6, three pricing tiers have been defined labeled "good" 610, "better" 612, and "best" 614. A campaign designer need not specify all three tiers, but the intent is that each tier represents a discount to the shelf price. For example, in FIG. 1, the "good" price of $2.50 offers a $0.50 discount off the shelf price of $3.00, the "better" price of $2.25 offers a discount of $0.75, while the "best" price of $2.00 offers a discount of $1.00 off the shelf price.

GUI 600 may also include a "minimum advertisement availability" field 618 and a "maximum advertisement availability" field 620, the values of which determine the minimum and maximum number of days that an offer is presented or offered to the consumer. The "minimum advertisement availability" value 618 may be specified by the campaign designer and instructs arbiter 122 to provide the offer to the consumer for at least the number of days indicated in field 618. Likewise, the "maximum advertisement availability" value 620 instructs arbiter 122 to expire the offer after the number of days indicated in field 620. Information related to maximum advertisement availability may be conveyed to the consumer via the distribution channels as part of the offer to ensure that the consumer knows the exact duration of the offer. The first day that an offer is theoretically viewable/accessible by a consumer may be considered as day one. For example, if an offer is distributed via a web site, the first day that the offer is made available via the web site is considered as day one, even though the consumer may not view or even know about the offer on that day. The minimum and maximum advertisement availability thresholds may be calculated from day one. It should be apparent that, irrespective of the minimum and maximum advertisement availability values, an offer cannot exist past the termination date of the campaign which generated the offer. Further, according to an embodiment of the present invention, the minimum and maximum advertisement availability thresholds may be overridden during the lifetime of an offer.

The present invention guarantees that the offer is enabled at the retail POS system 102 on or before day one (i.e. before the offer is provided to the consumer). Arbiter 122 may be configured to activate an offer at the POS system and then distribute the offer to one or more consumers via distribution channels 126. A consumer could get the deal provided by the offer at the checkout register of the retail POS system 102 even without accessing the offer via a distribution channel. In this manner, the consumer does not have to be aware of the offer to receive benefit from the offer. After an offer has expired, arbiter 122 may first deactivate/remove the offer from all the distribution channels to ensure that the offer is not viewed by any consumer, and may then send a message to retail POS system 102 instructing the POS system to deactivate the offer.

GUI 600 may also include a "limit per trip" field 622 and a "limit per shopper" field 624. The value specified in the "limit per trip" field 622 indicates the maximum number of units of the incented product that a consumer can purchase at the offered price each time that the consumer passes through the checkout line of a retail store. The value specified in the "limit per shopper" filed 624 indicates the maximum number of units of the incented product that a consumer or shopper can purchase based upon the offer.

The "limit per trip" and "limit per shopper" limits may be enforced by POS controller 116 which is coupled to checkout registers 112 (see FIG. 1). According to an embodiment of the present invention, POS controller 116 may be programmed using a third party interface which may be programmed to supply price and limit overrides to the POS over a network from a centralized server. In alternative embodiments, the limits may be enforced by marketing system 110. Based upon purchase information for a consumer received from retail POS system 102, YME module 120 may issue a request to arbiter 122 to deactivate the offer after either of the limits have been reached. Arbiter 122 may then remove the offer from the distribution channels and send a request to retail POS system 102 to deactivate the offer.

Slider 626 allows the campaign designer to set a priority for the offer. The priority value indicates how important it is for the campaign designer that the offer be presented to the consumer. As described above, the priority information is used by arbiter 122 to determine which offers are to be selected to be shown/provided to the consumer via distribution channels 126. An offer with a high priority value has a higher probability of being selected by arbiter 122 to be presented to the consumer than an offer with a lower priority value.

The value in "ad optional" field 628 suggests to arbiter 122 that the offer need not be presented to the consumer after the number of days indicated by value 628. This is merely supposed to be a hint to arbiter 122 and does not require that the offer be removed or deactivated. For example, if "ad optional" is indicated, arbiter 122 is not under an obligation to display the offer via distribution channels 126 when it selects the offer for delivery to the customer. The customer may "get lucky" and receive the promotion even if they did not view any advertising. Nonetheless, the customer may still become aware of the offer by reading their register receipt. Customers who repeatedly "get lucky" may have this feature disabled if it appears that there is no promotional value to the retailer accruing. Similarly, customers who are made offers that they redeem, but who infrequently or never view advertising corresponding to the offers, may be discontinued from promotion targeting if it appears that their buying behavior is not being influenced by the presence of the offer promotions (i.e. the offer promotions are only noticeable by reading the register receipt). YME module 120 may notice for example that a customer who never uses the distribution/advertisement channel 126 does not spend more at the store in spite of receiving significant promotions. In this case, YME module 120 may discontinue making offers to the customer who is not "engaging" with the advertisement/distribution distribution channel 126.

GUI 600 also allows the user to specify information about various budget values. Budgets may refer to the markdown dollars that a campaign designer or retailer is willing to spend on a campaign. Markdown dollars refer to the amount of discount below the shelf price which is spent to promote the incented product. The value specified in "shopper budget" field 630 indicates the total markdown dollars per campaign that a campaign designer or retailer is willing to spend on a particular consumer. YME module 120 will not generate new offers on an incented product for a consumer who has already had this many markdown dollars redeemed on the same incented product.

The retailer and/or the manufacturer may each contribute markdown dollars towards the promotion of the incented product. Accordingly, GUI 600 includes minimum, maximum, and target fields for the retailer ("Min Product Budget" field 632, "Target Product Budget" field 634, and "Max Product Budget" field 636) and for the manufacturer ("Min CPG Budget" field 638, "Target CPG Budget" field 640, and "Max CPG Budget" field 642). The value specified in Min Budget field 632 and/or 638 indicates the minimum amount of markdown dollars that a retailer and manufacturer, respectively, is willing to spend in aggregate on promoting the incented product. The retailer or manufacturer generally commits up front to spend this amount. In accordance with the present invention, marketing system 110 may adjust the priority associated with an offer (i.e. influence the probability that the offer is selected to be presented to the consumer) to achieve this level of expense. The value specified in Max Budget field 636 and/or 642 indicates the maximum liability that the retailer or manufacturer is willing to incur on every consumer who sees the offer and accepts the offer. In accordance with the present invention, YME module 120 may be configured not to generate an offer that would cause the maximum budget limit to be violated. The value specified in target budget field 634 and/or 640 indicates the target amount of markdown dollars that the retailer and the manufacturer, respectively, would like to spend on the product promotion. Marketing system 110 strives to achieve this target when generating offers and selecting offers to be presented to the consumer.

The amount of synergy between a retailer and a manufacturer of an incented product may be measured by the sum of the retailer and manufacturer budgets. If the sum is high, the campaign writer may decide to use more compelling "good," "better," and "best" prices in the incented product or target a wider audience. If the sum is low, the campaign designer may have to select only a few critical consumers to target in order to offer compelling, noticeable value. As indicated above, the priority value associated with an offer may be modified to achieve the budget goals described above. Arbiter 122 may then use the priority values to determine which offers are actually presented to the consumer via the distribution channels.

In accordance with the present invention, marketing system 110 maintains state information for each consumer in a collection of data known as the "shopper profile" or "consumer profile" file. The state information for a consumer may include information related to the consumer's purchase history, offers made to the consumer, and the consumer's response to the offers (this information may also be stored in the "tlog essence" file). The state information for a shopper also includes attribute information for the consumers. Attribute information includes calculations performed based upon the consumer's purchase history. The individual consumer state information is used by YME module 120 to determine how the consumer will be incented through offers. Based on the consumer's state information, the present invention is able to determine the effectiveness of a particular campaign and adjust to changing conditions. As indicated above, the state information for a consumer may be stored in a "consumer profiles" or "shopper profiles" file. The present invention also maintains state information for all the consumers involved in a campaign in a "global profiles" file.

Referring back to FIG. 5, tactics 520 and observations 522 allow the campaign designer to implement the rules and logic to be used for generating and distributing offers. As previously stated, offers are generated based upon a consumer's purchase data which is monitored by marketing system 110. YME module 120 may perform one or more calculations (called "attributes") on the consumer data. An "attribute" generally means a specific calculation stored in the consumer profiles file. An "observation" refers to facts computed about a consumer (called "local observation") or all the consumers (called "global observations"). An observation may be implemented with one or more attributes. Observations may be defined by campaign writers or may be imported from other campaigns.

Figure 7:
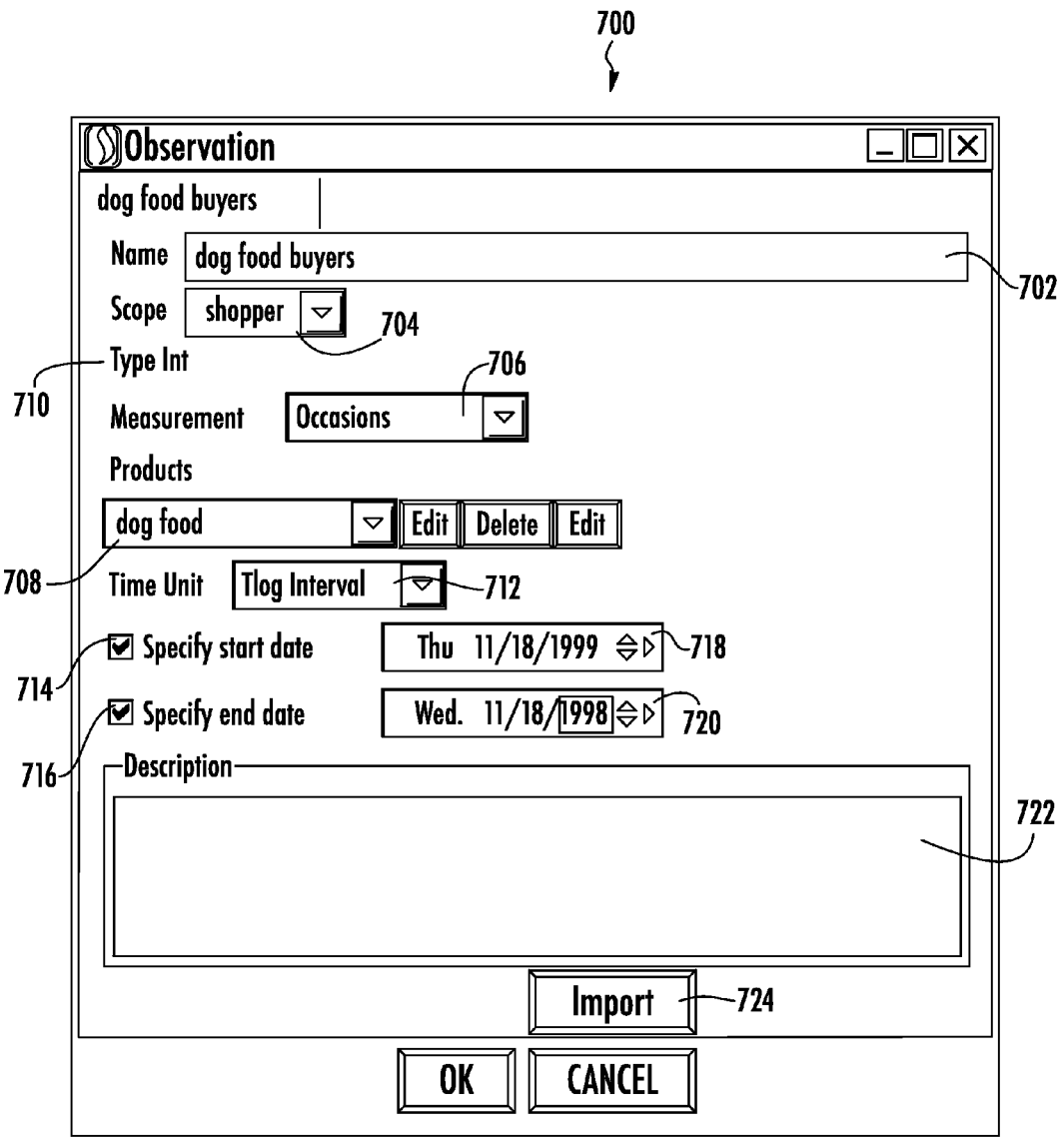
FIG. 7 depicts a graphical user interface for configuring observations according to an embodiment of the present invention.

FIG. 7 depicts a GUI 700 which may be used to configure observations according to an embodiment of the present invention. GUI 700 may be invoked by selecting "Edit" button 524 or "New" button 526 from GUI 500. "Delete" button 528 may be used to delete previously configured observations. As shown in FIG. 7, each observation may be referred to by a name. A string indicating the name of the observation may be specified in name field 702. An observation may be computed at different levels of scope. For example, the observation may compute a state of a consumer (scope is local) or alternatively may compute the state of all the consumers (scope is global). The scope of the observation may be specified in scope field 704. In FIG. 7, the observation named "dog food buyers" is configured to be computed for a consumer or shopper (scope is local).

Measurement field 706 may be used to specify a function which is to be applied to a given product set for the observation. The product set is specified in products field 708 and is explained below. Examples of measurements may include "Sales" which computes the total amount of money spent on a specified product, "Profits" which computes the retailer's profits for a product, "Items" which computes the total number of products purchased by the consumer, "Occasions" which computes the number of times the product was purchased, "Price Sensitivity" which computes a measure of how often a consumer purchases products when said products are discounted, "Brand Loyalty" which computes a measure of how often a consumer purchases products of the same brand within a specific product category, and other functions. For example, "Sales(diapers)" would record the total amount of money spent on diapers by a consumer. The measurement functions may have several different return values, e.g. integers, dates, floating point numbers, and so on. The return value of the measurement function is indicated by field 710 in FIG. 7, which shows that measurement "Occasions" returns a value of type integer (int).

The measurement of an observation may be further qualified by the period of time over which the measurement function is to be applied. The unit of time may be specified in time unit field 712. According to an embodiment of the present invention, the unit of time defaults to the value specified in field 510 depicted in FIG. 3 which specifies the time period during which observations are calculated for a campaign. The campaign designer may however override the default value for an observation by selecting "Specify start date" 714 and "Specify end date" 716 options, and by specifying the start and end dates in fields 718 and 720 respectively. "Description" field 722 allows the campaign designer to provide a description of what the observation is supposed to be computing.

In alternative embodiments of the present invention, an observation may be configured using other constraints or pieces of information. For example, observations or portions thereof from other campaigns may be used to define observations for a particular campaign. "Import" button 724 allows the campaign designer to import observations information from other campaigns.

As described above, measurement functions are applied to a product set which is specified in field 708. A product set identifies a collection of products and may be configured based on information identifying the products. For example, an identifier code of some kind is usually associated with each product offered for sale by a retailer that uniquely identifies the product. The identifier code may be in the form of a UPC symbol, a Product Lookup Code (PLU) symbol used to identify items lacking a UPC, and the like. A product may also have other information associated with it, such as the size of the product, the weight of the product, the product's "private labelness" (e.g. a retailer branded product), and so on. Each retailer may also assign a specific identifier to each product. Based on the specific identifier code, a product may be classified in a code-tree which may consist of several levels. According to an embodiment of the present invention, each level in a code-tree may be described by a pair of decimal digits, or a text string. Each code provides a general categorization of the product associated with the code. For example, "Code 65" may imply all diapers irrespective of their brand name.

Figure 8:
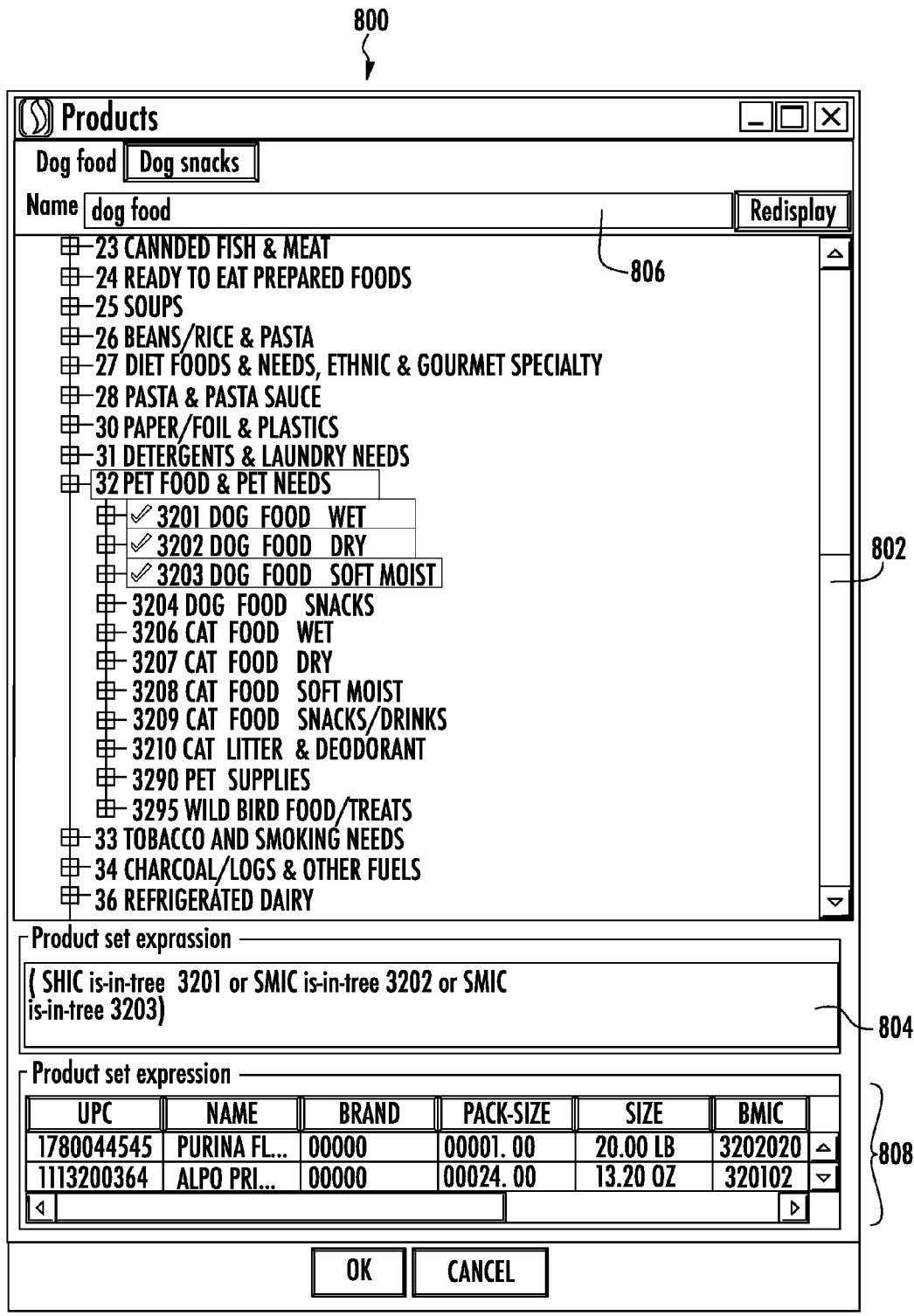
FIG. 8 depicts a graphical user interface for configuring a product set based upon a product code-tree according to an embodiment of the present invention.

According to an embodiment of the present invention, the product set (specified in field 708) may be configured from a code-tree. FIG. 8 depicts a sample GUI 800 which may be used by the campaign designer to define a product set based upon a code-tree according to an embodiment of the present invention. A section of a code-tree is displayed in GUI 800. The code-tree can be navigated using scrollbar 802. As shown, the code-tree comprises several levels. A campaign designer may expand a particular level by clicking the "+" sign next to the level. In this manner a user may navigate through the various levels of the code-tree.

The campaign designer may specify a name for the product set in field 806. The user may configure a product set by selecting one of more products from the code-tree. For example, as shown in FIG. 8, products with codes 3201, 3202, and 3203 have been selected by the campaign designer as belonging to the product set "dog food." Accordingly, in FIG. 8, product set "dog food" includes all products with a code of 3201 or 3202 or 3203. The expression for the product set is displayed in field 804. The actual products which make up the product set may be shown in area 808.

Product descriptions, including code descriptions associated with the products, may change over time and these changes may be automatically captured by marketing system 110 from retail POS system 102. Changes may be also be time stamped by marketing system 110 In accordance with the present invention, YME module 120 computes consumer states based upon the product descriptions in effect at the time the product was purchased. According to an embodiment of the present invention, a GUI (not shown) may be provided which allows users to view product purchases from the past according to new or updated product information. It should be apparent that in alternative embodiments of the present invention, a product set may also be configured using other information (other than codes shown in FIG. 8) associated with products.

Referring back to FIG. 7, an observation labeled "dog food buyers" has been defined which computes the number of occasions that a consumer purchases "dog food" between the specified start date and the end date. A plurality of observations may be configured by the campaign designer for any given campaign. Further, observations may also be imported into a particular campaign from other campaigns. Button 724 facilitates the process of importing observations.

Figure 9:
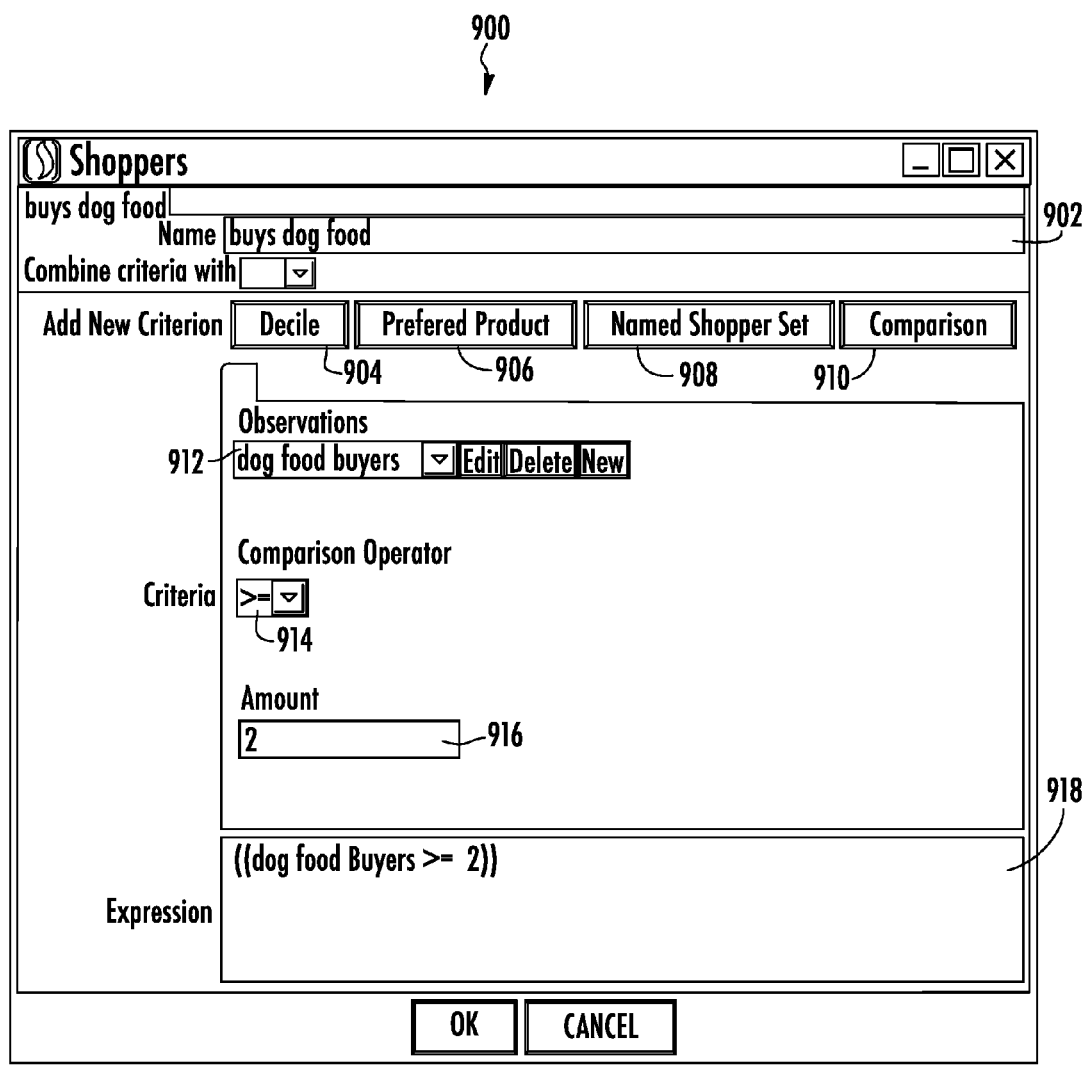
FIG. 9 depicts a graphical user interface for configuring shopper/consumer sets according to an embodiment of the present invention.

After configuring one or more observations, a user of the present invention may then identify the consumers to be targeted by the campaign. The consumers may be identified via one or more consumer (or shopper) sets. Each consumer or shopper set comprises a particular class of consumers which satisfy one or more conditions. According to an embodiment of the present invention, the conditions refer to constraints applied to one or more observations. FIG. 9 depicts a GUI 900 which allows a campaign designer to configure shopper/consumer sets according to an embodiment of the present invention. As shown in FIG. 9, a shopper set may be identified by a name specified in name field 902. A campaign designer may specify several constraints on an observation. GUI 900 allows the campaign designer to specify up to three constraints on an observation. These constraints include a "decile" constraint, a "preferred product" constraint, and a "comparison" constraint.

Selection of button 904 enables the campaign designer to invoke interfaces (not shown) to specify a decile range constraint on an observation. Using the decile constraint, the campaign designer can identify consumers who are in a specific decile range for an observation. For example, suppose an observation is configured to compute sales of oranges. If the user is interested in targeting consumers in the top 3 deciles of orange buying, the user can specify decile criteria indicating deciles 1 through 3. A consumer in the top 1 decile indicates that the consumer purchased more oranges than another consumer in a decile of 10.

Selection of button 906 enables the campaign designer to invoke interfaces (not shown) to specify a preferred product constraint on an observation. The preferred product constraint allows a campaign writer to select from a set of different observations. For example, assume that the campaign designer wants to configure the campaign to give offers on oranges to people who prefer oranges to apples, and offers on apples to people who prefer apples to oranges. If "apple_buying" is an observation measuring sales of apples, and "orange_buying" is an observation measuring sales of oranges, the campaign designer can implement two different shopper sets by adding apple_buying and orange_buying to the candidate set for each shopper set, and then setting apple_buying to be the target observation for the "apple_preferrers" shopper set and orange_buying to be the target observation of the "orange_preferers" shopper set. Only consumers who match the corresponding observations are selected for tactics that generate personalized offers.

Selection of button 910 enables the campaign designer to invoke interfaces (not shown) to specify a comparison constraint on an observation. A comparison constraint performs an arithmetic comparison on a numeric value returned by an observation. For example, if the campaign designer wants to target consumers who spend greater than $3 monthly on peas, an observation may be configured to determine the amounts spent by individual consumers on peas on a monthly basis, and then a comparison constraint may be configured to identify those consumers who spend more than $3. GUI 900 in FIG. 9 displays a comparison constraint being applied to an observation according to an embodiment of the present invention. Field 912 identifies the observation to which the constraint is applied. Field 914 identifies the comparison operator to be applied to the observation. Amount 916 identifies the numeric comparison amount. Field 918 displays the expression for the constraint. For example, FIG. 9 configures a consumer set "buys dog food" which is defined by applying a comparison constraint to observation "dog food buyers" to identify consumers who made at least two purchases of product set "dog food." As indicated in FIG. 8, the product set "dog food" includes products with a code of 3201, 3202, or 3203.

In accordance with the present invention, shopper/consumer sets may also be imported from other campaigns. Button 908 facilitates the process of importing named shopper sets from other campaigns.

Referring back to FIG. 5, the campaign writer may specify the business rules or logic for generating offers by selecting "Tactics edit" button 530. Several different techniques may be used by the present invention to both specify and implement the logic rules. According to an embodiment, the present invention may use decision trees, tactics, and tactic finite state machines to implement the logic rules. YME module 120 may apply standard techniques for managing state transitions in finite state machines.

Each campaign may include a decision tree that allows the campaign designer to string shopper sets together into a decision process. The primary goal of a decision tree is to assign a subset of consumers to a "tactic" which is a method of generating an offer for an individual consumer. A decision tree created by the campaign designer decides which consumers get which tactics, or get no tactics at all. Once a consumer has been assigned to a tactic, the tactic state machine takes over and handles generation of offers for the consumer. As stated above, according to an embodiment of the present invention, processing related to generation of offers is performed by YME module 120.

Figure 10:
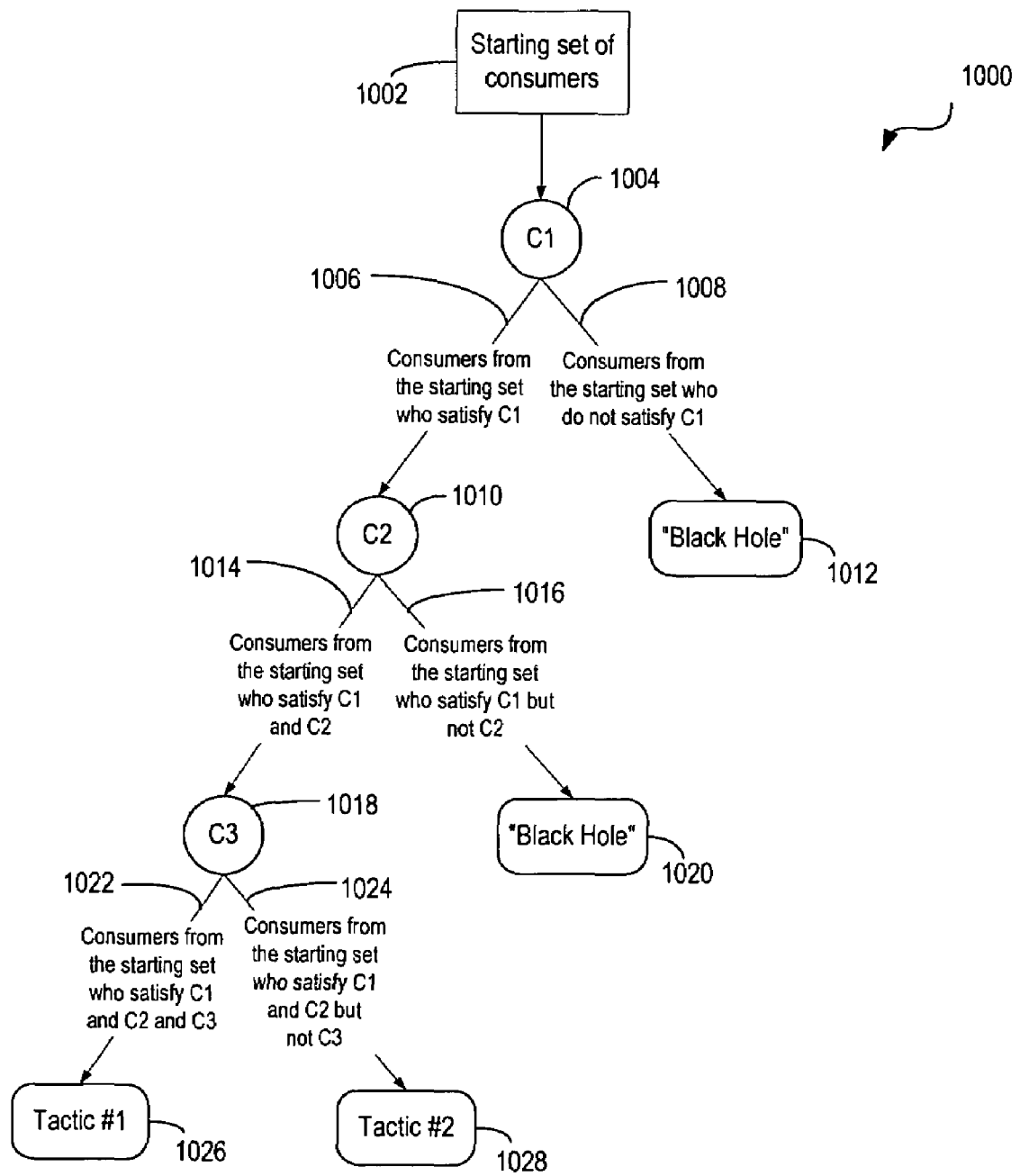
FIG. 10 depicts a logical representation of a decision tree according to an embodiment of the present invention.

FIG. 10 depicts a logical representation of a decision tree 1000 according to an embodiment of the present invention. As shown in FIG. 10, a decision tree may comprise a plurality of nodes and may have several levels. A condition may be associated with one or more nodes of the decision tree. Each node receives a consumer set as input, and based upon whether or not the consumers from the input set satisfy the node condition, the consumers are passed along one of the two branches emanating from the node.

For example, in FIG. 10, processing of decision tree 1000 begins at starting node 1004 which has condition "C1" associated with it. Node 1004 receives consumer set 1002 as input. At node 1004, all consumers in set 1002 which match condition "C1" are passed along link 1006 while consumers in set 1002 which do not satisfy condition "C1" are passed along link 1008. Consumers passed along link 1008 are received by node 1012 which has no condition associated with it or no links emanating from it. Node 1012 (may also be referred to as a "black hole") serves as a holding area for consumers who receive no further consideration during the lifetime time of the campaign.

The set of consumers passed along link 1006 (consumers from set 1002 who satisfy condition "C1") are then subjected to condition "C2" associated with node 1010. Consumers which match condition "C2" are passed along link 1014 while consumers who do not satisfy condition "C2" are passed along link 1016. Consumers passed along link 1016 are received by "black hole" node 1020 and receive no further consideration during the lifetime time of the campaign.

Consumers passed along link 1014 (consumers from set 1002 who satisfy conditions "C1" and "C2") are then subjected to condition "C3" associated with node 1018. Each consumer who matches condition "C3" is then assigned to tactic 1026. The tactic state machine for tactic 1026 then takes over and handles generation of offers for each consumer assigned to the tactic. Each consumer who does not match condition "C3" is then assigned to tactic 1028 (which may or may not be different from tactic 1026). The tactic state machine for tactic 1028 then takes over and handles generation of offers for each consumer assigned to tactic 1028.

For example, lets assume that the decision tree depicted in FIG. 10 has been configured for a campaign designed to target consumers who buy diapers at retail stores. Condition "C1" associated with node 1004 may identify consumers who purchase more than $10 worth of baby supply category products per week. If a consumer satisfies condition "C1", the consumer is passed along link 1006. Consumers who do not satisfy the condition, possibly indicating that they do not have a baby, are no longer considered. Condition "C2" associated with node 1010 may identify consumers who have weekly diaper purchases of more the $5.00. Consumers satisfying condition "C2" are passed along link 1014 while consumers not satisfying condition "C2", possibly indicating that they do not use diapers, are not considered for the term of the campaign. Consumers passed along link 1014 are then subjected to condition "C3" which may identify consumers who buy diapers of Brand X. Consumers who buy diapers of Brand X may then be assigned to tactic 1026 customized for users of Brand X, while consumers who do not satisfy condition "C3" (i.e. do not buy diapers of Brand X) may be assigned to tactic 1028 designed for users of diapers other than Brand X. Accordingly, consumers assigned to tactic 1026 include consumers who purchase more than $10 worth of baby supply category products per week, have weekly diaper purchases of more the $5.00, and buy diapers of Brand X. Consumers assigned to tactic 1028 include consumers who purchase more than $10 worth of baby supply category products per week, and have weekly diaper purchases of more the $5.00, but do not buy diapers of Brand X.

As shown above, a decision tree, such as tree 1000 depicted in FIG. 10, enables a campaign designer to identify and target consumers who are to be assigned to tactics. The conditions associated with a node typically comprise observations and constraints associated with the observations. As indicated above, for a particular campaign, observations may be imported from other campaigns or may be exported to other campaigns.

A tactic is a method of generating an offer for a particular consumer. As indicated above, after a consumer has been assigned to a tactic, the tactic state machine for the tactic takes over and handles generation of offers for the consumer. According to an embodiment of the present invention, a tactic state machine may comprise one or more states. Each state is like a grocer, waiting to make an offer to a consumer. Each state may have an incented product and a purchase price for the incented product associated with it. This information is used by the state to generate an offer for the consumer. Further, two different states may offer the same product at the same price. Depending on stimuli provided to a state, the state may either generate an offer for the consumer, do nothing, or transition the consumer to another state. The goal of each state is to get the consumer to purchase the offered product at the offered price. According to an embodiment of the present invention, processing related to tactics may be performed by YME module 120.

When a consumer is assigned to a tactic, the tactic state machine starts out in a "start state." The start state may make an offer to the consumer based on the incented product and the price information associated with the start state. More generally, the term "current state" will be used to refer to the present state of the tactic state machine.

Figure 11:
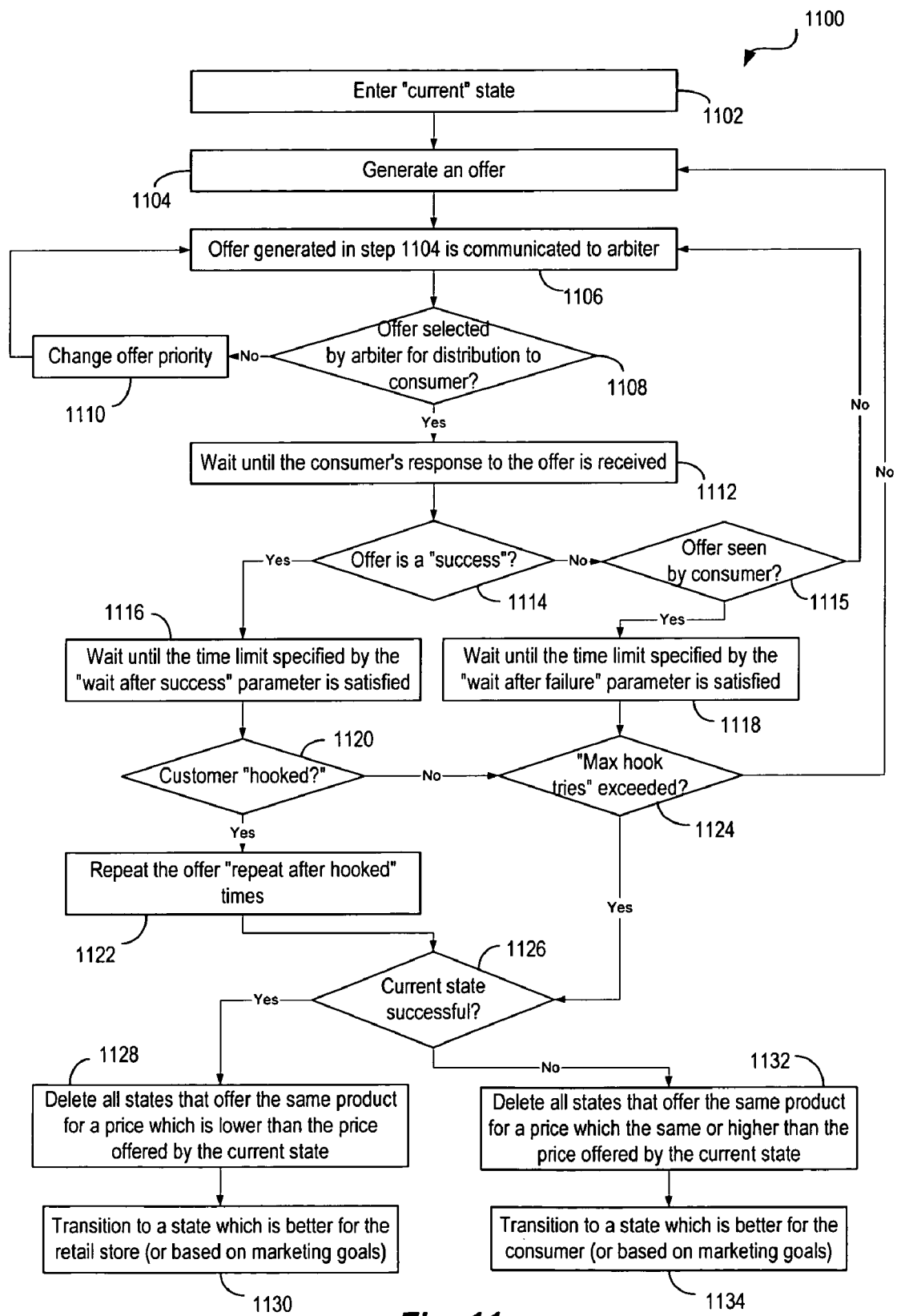
FIG. 11 is a simplified high-level flowchart showing processing performed by the present invention within a current state and during a transition from the "current" state to a "next" state according to an embodiment of the present invention.

FIG. 11 is a simplified flowchart 1100 showing processing performed by the present invention within a current state and during a transition from the "current" state to the "next" state according to an embodiment of the present invention. The processing depicted in FIG. 11 may be performed by YME module 120 or any other module executing on marketing system 110. As shown in FIG. 11, processing is initiated when the tactic state machine corresponding to a tactic enters into a "current" state (step 1102). For example, when a consumer is first assigned to a tactic, the tactic state machine enters a "start" state which is then the "current" state for the tactic state machine.

The current state may then generate an offer offering a product at a particular price for a particular time period (step 1104). The offer generated by the current state may then be communicated to arbiter 122 (step 1106). According to an embodiment of the present invention, a special file may be used to communicate information related to the generated offer to arbiter 122. As described above, arbiter 122 may then decide whether or not to select the generated offer for distribution/advertisement to the consumer.

YME module 120 may then determine if the generated offer was selected by arbiter 122 for distribution to the consumer (step 1108). If arbiter 122 selects the generated offer to be presented to the consumer, a message ("offer_selected") indicating the selection and distribution of the offer to the consumer may be communicated from arbiter 122 to YME module 120. If the offer is not selected by arbiter 122, then a message ("offer_not_selected") indicating the non-selection may be communicated from arbiter 122 to YME module 120. If a pending offer is withdrawn by arbiter 122, a message ("offer_withdrawn") indicating the withdrawal is communicated from arbiter 122 to YME module 120. Various messaging technologies known to those of ordinary skill in the art may be used to facilitate communication of information and messages between YME module 120 and arbiter 122.

YME module 120 may not generate an offer in step 1104 if budgetary considerations associated with the campaign so dictate. For example, if all the markdown dollars allocated to a campaign have been expended, the tactic state machine may be terminated, or alternatively, a wait state may be induced in the state machine waiting for more markdown dollars to be allocated to the campaign. Offers may also not be generated for other reasons, e.g. termination of the campaign corresponding to the tactic state machine, etc.

If it is determined in step 1108 that the offer was not selected by arbiter 122 to be advertised to the consumer, the tactic state machine may remain in its current state. The current state may then reissue the offer to arbiter 122 (step 1106) either immediately or after some time period. For example, if arbiter 122 did not select the offer because all slots for a distribution channel were occupied, the current state may reissue the offer after receiving a signal from arbiter 122 indicating that free distribution slots are available. Alternatively, the current state may automatically raise the priority value associated with the offer (step 1110), thus increasing the probability that arbiter 122 will select the offer that next time that the offer is issued to arbiter 122. The offer with the modified priority may then be communicated to arbiter 122 according to step 1106. Various other techniques may also be used by YME module 120 to reissue the offer.

If it is determined in step 1108 that the offer was selected by arbiter 122 to be distributed/advertised to the consumer (i.e. an "offer_selected" was received by YME module 120 from arbiter 122), the tactic state machine may wait in its current state (step 1112) until it receives an indication that the consumer purchased the offered product during the offer pendency, a message indicating the expiration of the offer (e.g. a message indicating that the maximum advertisement availability timer value limit has been reached), a signal indicating the end of the campaign, or other like signal or message.

Upon receiving an indication or message, e.g. a message indicating that the time period associated with the offer generated in step 1104 has expired, the present invention may then determine whether the offer was a success or a failure (step 1114). An offer is deemed to be a "success" if the consumer to whom the offer was given purchased the offered item during the pendency of the offer. The success of an offer is defined independently of the consumer having actually viewed or accessed the offer. This is because, once an offer has been activated at retail POS system 102, a consumer may fortuitously purchase the product at the offered price during the pendency of the offer even without being aware of the offer. Accordingly, success of a pending offer is indicated solely by the purchase of the offered product by the consumer. The present invention may determine whether or not the product was purchased by the consumer by monitoring the consumer's purchase history information which may be received from retail POS system 102.

An offer is considered to be a "failure" if the consumer does not purchase the offered product during the pendency of the offer. A failure condition may be determined by YME module 120 when the time limit associated with an offer has expired and the consumer has not yet purchased the offered product. An offer may fail under two conditions: (1) the consumer has viewed/accessed the advertisement corresponding to the offer but did not purchase the offered product during the time period associated with the offer; or (2) the consumer did not purchase the offered product during the time period associated with the offer but also did not access/view the offer (e.g. the consumer never engaged any distribution channel used for advertising the offer). Condition (1) indicates a "real" failure, while condition (2) cannot be attributed to the offer since the consumer was not aware of the offer.

Accordingly, if it is determined in step 1114 that the offer was a failure (i.e. the consumer did not purchase the offered product during the pendency of the offer), the present invention may then determine if the offer was seen or viewed or accessed by the consumer (step 1115). The present invention may determine this based on feedback information received from the distribution channels used to distribute/advertise the offer. According to an embodiment of the present invention, if a particular distribution channel was accessed or engaged by the consumer after the offer was activated, the distribution channel may transmit a message ("offer_seen" message) to arbiter 122 indicating that the offer was seen or viewed or accessed by the consumer. Arbiter 122 may then communicate the "offer_seen" message to YME module 120. For example, for web-based channels, the "offer_seen" message may be transmitted after the distribution channel has determined that the consumer has accessed a web page displaying the offer, or read an email providing the offer details, and the like. For direct mail channels, the message may be sent after the materials related to the offer have been mailed to the consumer and the mailed material did not come back as undeliverable. For IVR systems, the message may be sent once the consumer has accessed the IVR system after the offer has been activated. For a dispenser, the message may be sent after the consumer has "swiped" his/her loyalty card in the dispenser after the offer has been activated for the dispenser. Various other techniques may also be used by the distribution channels to determine if the consumer has accessed/viewed the offer.

If it is determined in step 1115 that the consumer has not seen or viewed or accessed the offer, the offer may be sent back to arbiter 122 according to step 1106 (i.e. replayed as if nothing happened). An offer which was not viewed/accessed may also be withdrawn from the POS system without affecting the status of the consumer. The distribution/advertisement channels may employ different expiration periods for the same offer. An offer that has expired on one channel can be safely withdrawn from the POS by a second channel that has a longer expiration even if the second channel is not apprised of whether or not the consumer viewed the offer at the first channel as long as the second channel ensures that the offer period used by the first channel has expired.

If it is determined in step 1115 that the consumer saw/viewed/accessed the offer but did not purchase the offered product before the offer expired, thereby indicating a real failure, processing may continue with step 1118. In step 1118, the tactic state machine may enter into a wait condition until the time limit specified by the "wait after failure" parameter has been satisfied. The "wait after failure" parameters tells the tactic state machine, as implemented by YME module 120, to refrain from generating any new offers after a failed offer until the time specified by the "wait after failure" parameter has been exceeded. According to an embodiment of the present invention, the "wait after failure" parameter is expressed in days. However, the parameter may also be specified using other time units in alternative embodiments of the present invention. As stated above, the "wait after failure" parameter instructs the tactic state machine to wait for a specified period of time before making another offer—perhaps because the campaign designer does not want to bore the consumer with the offer right after a failed offer, and because the likelihood of the consumer accepting a previously rejected offer right away is not very high. After the time limit set by the "wait after failure" parameter has been satisfied, processing may continue with step 1124.

If YME module 120 determines in step 1114 that the offer was a success (i.e. the consumer purchased the offered product during the pendency of the offer), the tactic state machine may enter into a wait condition until the time limit specified by the "wait after success" parameter has been satisfied (step 1116). The "wait after success" parameters tells the tactic state machine, as implemented by YME module 120, to refrain from generating any new offers after the success of an offer until the time specified by the "wait after success" has been exceeded. According to an embodiment of the present invention, the "wait after success" parameter is expressed in days. However, the parameter may also be specified using other time units in alternative embodiments of the present invention.

The use and effect of the "wait after success" parameter may be illustrated by the following example. Suppose the consumer had purchased a 100 gallon drum of laundry detergent in response to an offer (i.e. the offer was successful). It would be illogical to make another offer on laundry detergent right away. The "wait after success" parameter instructs the tactic state machine to wait for a specified period of time before making another offer. The amount of time specified by the "wait after success" parameter may depend on the campaign designer's sense of how frequently the consumer is likely to use up a product or make another purchase of the product. For example, if the campaign designer, using his judgment, believes that the 100 gallon drum of the previously purchased laundry detergent will last the user for a period of 6 months, the "wait after success" parameter may be set to 6 months. Accordingly, no new offer on a laundry detergent will be made to the consumer for at least six months. After the time limit set by the "wait after success" parameter has been satisfied, processing may continue with step 1120.

The goal of each state of the tactic state machine is to make the consumer purchase the offered product at the offered price. In order to satisfy this goal, the current state may repeatedly make the same offer to the consumer over a period of time. A consumer may be considered to be "hooked" on an offer if the consumer purchases the offered product for a specified number of times. The "hook count" specifies the number of times that a repeated offer must be successful in order for the consumer to be considered as "hooked." The "maximum tries to hook" parameter indicates the maximum number of times that a state will repeat an offer to a consumer in an attempt to "hook" the consumer. Accordingly, each state can tolerate some failures along the way to hooking a consumer.

The use of the "hook count" and "maximum tries to hook" parameters may be illustrated by the following example. Suppose that the current state made an offer offering chocolate to a consumer at $0.40/lb. for a specified time period. If the offer was successful (i.e. the consumer purchased the chocolate at the offered price during the specified time period), the same offer may be made again to the consumer to really "hook" the consumer on chocolate at $0.40/lb. before transitioning to a different state which may generate a different offer with different margin implications for the retail store. Likewise, if the offer failed (i.e. the consumer did not purchase the chocolate during the specified time period), the same offer may be made again to the consumer with the hope that the consumer will accept the second offer and start getting "hooked." For example, lets assume that the "maximum tries to hook" parameter for the chocolate offer is set to 3 and the "hook count" parameter is set to 2. If the consumer purchased the offered chocolate on the first two offers, or on the first and third offer, or on the second and third offer, the consumer is considered "hooked." If however, the consumer did not buy chocolate at least twice in response to the three offers, the state failed to "hook" the consumer.

Referring back to FIG. 11, after step 1116, the present invention may then determine if the consumer is "hooked" (i.e. the number of successful offers has reached the "hook count" parameter value) on to the offered product (step 1120). According to an embodiment of the present invention, if the consumer is "hooked," the present invention may then repeat the offer until the "repeat after hooked" parameter value has been satisfied (step 1122). Processing then continues with step 1126. The "repeat after hooked" parameter allows the campaign designer to make the same offer to the consumer for a specified number of times after the consumer has been "hooked." For example, assuming that the "repeat after hooked" parameter for the chocolate offer was set to 2 tries, the offer is repeated twice after the consumer is "hooked." If the present invention determines in step 1120 that the consumer has not been "hooked," processing continues with step 1124.

In step 1124, YME module 120 may determine if the "maximum hook tries" parameter limit has been exceeded. If the "maximum hook tries" parameter limit has not been exceeded, processing may continue with step 1104 wherein the same offer may be generated in an effort to "hook" the consumer. If the "maximum hook tries" parameter limit has been exceeded, processing continues with step 1126. Accordingly, before a transition is made from the current state to a next state in the tactic state machine, the offer generated by the current state may be repeated to the consumer "maximum tries to hook" times in an effort to hook the consumer.

The present invention may then determine if the current state was a success or a failure (step 1126). A state is considered a "success" if the consumer was "hooked" by the state, i.e. the consumer purchased the offered product "hook count" times, else the state is considered a "failure." The next state to which the tactic state machine transitions to from the current state depends on the outcome of step 1126. If the current state was a success, the tactic state machine may transition (step 1130) to the next closest state which is more beneficial to the retailer or offers a higher profit margin to the retailer. The profit margin for a retailer is generally the price at which a product is offered for sale minus the cost of the product to the retailer. For example, the next state may offer the same product as the current state but at a higher price, or the next state may offer a brand name product of the retailer which provides a higher profit margin for the retailer. If the current state was not successful, the tactic state machine may transition (step 1134) to the next closest state which is more beneficial to the consumer, such as a next state which makes offers which provide lower profit margins for the retail store and higher discounts for the consumer (e.g. by offering the same product as the current state but at a reduced price), or a next state which makes offers on non-store branded products instead of store brand products.

In alternative embodiments of the present invention, the transition from the current state to the next state may also be based upon marketing goals associated with one or more states of the tactic state machine. These marketing goals may be configured by the campaign designer and may or may not be tied to the prices or profit margins associated with the offers. For example, the marketing goals may be geared towards fostering consumer loyalty for a particular brand of products. For example, if a consumer consistently buys Brand X dog food for $2, the retailer or manufacturer may want to offer Brand X dog food to the consumer for $1 to award the consumer's loyalty towards Brand X. Alternatively, the tactic state machine may be configured to offer Brand Y dog food to the consumer for $1 in order to market Brand Y dog food and to entice the consumer to buy Brand Y dog food instead of Brand X dog food. Marketing goals may thus be used to foster consumer loyalty, to acquire customers, and to achieve other marketing functions. Accordingly, a transition from the current state to a next state may be controlled by marketing goals associated with the current state and/or the next state.

According to an embodiment of the present invention, before transitioning from the current state to the next state, if the current state was successful, the present invention may delete all states that offer the same product for a price which is lower than the price offered by the current state (i.e. states that are better for the consumer than the current state) (step 1128). This is due to the fact that the success of the current state implies that the consumer is willing to purchase the product offered by the current state at the offered price. Accordingly, states which offer the same product at a price lower than that offered by the current state may be deleted. If the current state was not successful, the present invention may delete all states that offer the same product for a price that is equal to or higher than the price offered by the current state (step 1132). This is due to the fact that the failure of the current state implies that the consumer is not willing to purchase the product offered by the current state at the offered price or any higher price. Accordingly, states that offer the same product at the same price or higher price than that offered by the current state are useless and may be deleted. The success or failure information associated with the current state may also be reset just before a transition to a new state, thus allowing the current state to be revisited later.

Deletion of states according to steps 1128 and 1132 may not be performed in other embodiments of the present invention. In these embodiments all the states of a tactic state machine are retained during the course of the campaign. Accordingly, any state, even if it failed, may be retained such that a previously failed state may be revisited during the course of the campaign. For example, assume a tactic state machine having 3 states that offer peas at $1 (state A), $2 (state B), and $3 (state C). If state A succeeds, the state machine transitions to state B. If state B succeeds, the state machine transitions to state C. If state C fails, the state machine may transition back to state B, and if state B fails, the state machine may transition to state A. Since none of the states are deleted, the state machine may transition to any of the states of the state machine.

The tactic state machine may then transition to the next state according to step 1130 or step 1134, and the processing depicted in FIG. 11 may be repeated for the next state. The "wait after success," "wait after failure," "hook count," "maximum number of tries to hook," and "repeat after hooked" parameters apply to each state including the "next" state (with same or different values). Accordingly, the conditions set by these parameters have to be satisfied before transitioning from the "next" state to another state.

If the tactic state machine comprises only one state, either because the other states were deleted or because the tactic state machine was configured with only one state, steps 1130 and 1134 may transition back to the existing current state. For example, assume a tactic state machine having 3 states that offer diapers of Brand X at $2, $3, and $4, respectively, and wherein states are deleted according to steps 1128 and 1132. If the state offering Brand X diapers at $3 succeeded, then the state offering Brand X diapers at $2 is deleted. Then, if the state offering Brand X diapers at $4 was a failure, then that state is deleted, leaving only the state which offers Brand X diapers at $3. The state offering Brand X diapers at $3 remains even though the "repeat after hooked" parameter may be exhausted. If this remaining state fails, then this state will also be deleted. In this case, when all states get deleted, the tactic state machine for that particular consumer ends and makes no more offers to the particular consumer. The processing depicted in FIG. 11, including processing performed in a particular state and state transition processing, may be performed for the lifetime of the campaign, until all states in a tactic state machine for a particular consumer get deleted, or until allowed by budgetary constraints.

The workings of a simple tactic state machine (wherein states are deleted according to steps 1128 and 1132) according to an embodiment of the present invention may be explained using the following example. Assume a tactic state machine which comprises the following states:

States Better for Retail Store

State 1: Offers retail store brand diapers at $5.00
State 2: Offers retail store brand diapers at $4.00
State 3: Offers Brand X diapers at $4.00
(S) (C) State 4: Offers Brand X diapers at $3.00 (C)

States Better for Consumer

The starting state is denoted by a "(S)" and the current state may be denoted by a "(C)." Accordingly, when a consumer is assigned to the tactic, State 4 is the starting and the current state. If State 4 succeeds in "hooking" the consumer, the tactic state machine transitions to the next closest state that is better for the retail store, i.e. State 3. After the transition, the status of the tactic state machine may be shown as follows:

States Better for Retail Store

State 1: Offers retail store brand diapers at $5.00
State 2: Offers retail store brand diapers at $4.00
(C) State 3: Offers Brand X diapers at $4.00
(S) State 4: Offers Brand X diapers at $3.00

States Better for Consumer

If State 3 also succeeds in "hooking" the consumer, the tactic state machine transitions to the next closest state that is better for the retail store, i.e. State 2. Before the transition, State 4 is deleted as the consumer is willing to pay a higher price (i.e. the price offered by State 3) for the same product (Brand X diapers). After the transition, the status of the tactic state machine may be shown as follows:

States Better for Retail Store

State 1: Offers retail store brand diapers at $5.00
(C) State 2: Offers retail store brand diapers at $4.00
State 3: Offers Brand X diapers at $4.00
(S) State 4: DELETED States Better for Consumer If State 2 fails to "hook" the consumer, the tactic state machine transitions to the next closest state that is better for the consumer, i.e. State 3. Before the transition, all states that offer the same product as that offered by State 2 for a price equal to or higher than the price offered by State 2 are deleted. Accordingly, States 1 and 2 are deleted from the tactic state machine. State 3 is not deleted since it offers a different product than that offered by State 2. After the transition, the status of the tactic state machine may be shown as follows:

States Better for Retail Store

State 1: DELETED
State 2: DELETED
(C) State 3: Offers Brand X diapers at $4.00
(S) State 4: DELETED States Better for Consumer Since State 3 is the only state remaining in the tactic state machine, this state continues to make offers until either State 3 is a failure or the campaign ends. If State 3 is also deleted for failing, the tactic state machine ends and no more offers are generated for the particular consumer.

Figure 12:
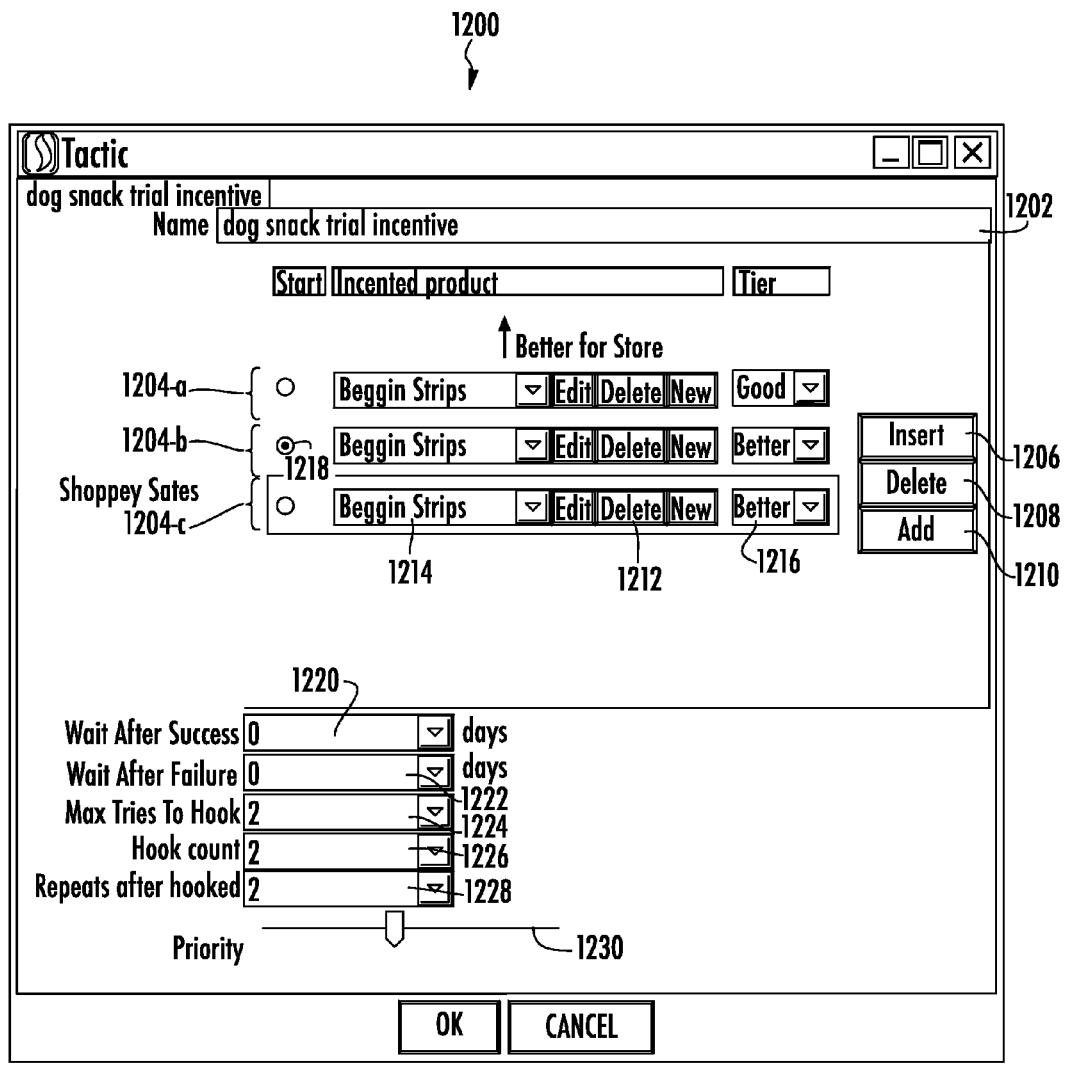
FIG. 12 depicts a graphical user interface for configuring a tactic according to an embodiment of the present invention.

FIG. 12 depicts a GUI 1200 that allows a campaign designer to configure a tactic according to an embodiment of the present invention. As shown in FIG. 12, the campaign designer may enter a name for the tactic in name field 1202. Rows 1204-a, 1204-b, and 1204-c indicate the various states in the tactic state machine. For example, tactic "dog snack trial incentive" shown in FIG. 12 is comprised of 3 states: 1204-a, 1204-b, and 1204-c. New states can be added by selecting "Add" button 1210. A new state may be inserted between two pre-configured states by selecting "Insert" button 1206. A pre-configured state may be deleted by selecting the state and then selecting "Delete" button 1208 or by selecting "Delete" button 1212 for the state. Each state identifies a product 1214 to be offered by the state and the price (or price tier as shown in FIG. 12) 1216 at which the product is offered. The "starting state" is indicated by selected radio button 1218. GUI 1200 also allows the campaign designer to specify values for the "wait after success" parameter (in field 1220), the "wait after failure" parameter (in field 1222), the "maximum tries to hook" parameter (in field 1224), the "hook count" parameter (in field 1226), and the "repeats after hooked" parameter (in field 1228). Each of these parameters may be set for each state of the tactic state machine. The campaign designer may also specify the priority value for an offer generated by a particular state by using slider bar 1230. In the embodiment depicted in FIG. 12, the states are organized according to an order such the states which make offers which are better for the retail store are located towards the top of the list while states which generate offers which are better for the consumer are located towards the bottom of the list.

The present invention provides several benefits over conventional marketing techniques. For example, as described above, decision trees, observations, and tactics serve as powerful tools allowing a campaign designer to implement business rules and logic to target consumers with particular products. The consumer, retailer, and the manufacturer may all benefit from using the present invention. Since the present invention allocates the markdown dollars provided by the retailer and manufacturer in a more efficient and customized manner, the consumer may receive savings which are not possible using conventional systems. Further, campaigns may be designed in such a manner as to reward consumers for their brand loyalty or loyalty to a specific retail store. From the retailer's and manufacturer's perspective, the business rules and logic may be designed to protect the retailer from margin erosion, and to protect the manufacturer from mindless brand switching by their loyal consumers. Due to the customized one-to-one nature of the offers, the likelihood of the consumer accepting the offer is much higher than offers generated by conventional marketing systems. As a result, retailers and manufacturers can make more effective use of their marketing budgets.

Further, since the business rules and logic are codified in the form of campaigns, they are reusable and self-documenting. Each campaign may be compiled as a single executable program that runs against per consumer data that allows the present invention to scale easily. The calculations and computations performed by the present invention are done automatically and incrementally. The calculations performed by the tactic state machine are done against a particular consumer's new purchases after an offer has been made to the consumer, and thus can be performed in a quick and efficient manner even against massive amounts of consumer information. Unlike conventional marketing techniques, a consumer does not have to be re-segmented or re-classified each time that an offer is made to the consumer. Retailers and manufacturers may thus focus on how a specific product is to be marketed. The present invention also provides a fully integrated system which ties the retail POS system with the offer generation system and the offer distribution/advertising channels. The present invention also lets campaign designers to simulate campaigns to determine the effectiveness and efficacy of the campaigns before applying the campaigns to consumers.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of making offers to consumers for a plurality of products sold by a seller, the method comprising:
    providing a system comprising a data processing system and a distribution system; and
    performing using the system:
        receiving information identifying a plurality of consumers;
        receiving purchase history information for the plurality of consumers, the purchase history information comprising information related to purchases made by the plurality of consumers;
        identifying a first consumer from the plurality of consumers based upon the purchase history information and the information identifying the plurality of consumers;
        generating a first offer, the first offer offering a product from the plurality of products for purchase at a first price for a first time period, wherein sale of the product offered by the first offer provides a first profit margin for the seller;
        receiving a first threshold "M", wherein "M"≧1;
        receiving a second threshold "N", wherein "N"≧1, and "N" is less than or equal to "M";
        (a) providing the first offer to the first consumer;
        (b) determining if the first consumer purchased the product offered by the first offer during the first time period;
        repeating (a) and (b) until the first consumer has purchased the product offered by the first offer at least "N" times or until the first offer has been offered to the first consumer "M" times;
        if the first consumer purchased the product offered by the first offer at least "N" times, generating a second offer for the first consumer, the second offer offering a product from the plurality of products for purchase for a second time period, wherein sale of the product offered by the second offer provides a second profit margin for the seller which is greater than the first profit margin; and
        if the first consumer did not purchase the product offered by the first offer at least "N" times and the first offer has been offered to the first consumer "M" times, generating a third offer for the first consumer, the second offer offering a product from the plurality of products for purchase for a third time period, wherein sale of the product offered by the third offer provides a third profit margin for the seller which is less than the first profit margin.

2. The method of claim 1 wherein the third offer is generated only if the third profit margin is above a margin threshold configured by the seller.

3. The method of claim 1 wherein:
    receiving the information identifying the plurality of consumers comprises receiving an identifier associated with at least one consumer from the plurality of consumers; and
    receiving the purchase history information for the plurality of consumers comprises receiving purchase history information associated with the identifier.

4. The method of claim 1 wherein identifying the first consumer from the plurality of consumers based upon the purchase history information and the information identifying the plurality of consumers comprises:
    receiving a plurality of conditions to be satisfied in order to receive the first offer;
    determining a set of consumers from the plurality of consumers who satisfy the plurality of conditions; and
    identifying the first consumer from the set of consumers.

5. The method of claim 1 further comprising:
    providing a state machine to control generation of offers, the state machine comprising a plurality of states wherein each state is configured to generate an offer; and
    wherein generating the first offer comprises:
        entering a first state of the state machine; and
        generating the first offer associated with the first state.

6. The method of claim 5 wherein generating the second offer comprises:
    transitioning from the first state to a second state which is configured to generate an offer which provides a profit margin for the seller that is greater than the first profit margin; and
    generating the offer associated with the second state.

7. The method of claim 6 further comprising deleting one or more states from the plurality of states which are configured to generate offers which provide profit margins for the seller that are lower than the first profit margin.

8. The method of claim 5 wherein generating the third offer comprises:
    transitioning from the first state to a third state which is configured to generate an offer which provides a profit margin for the seller that is lower than the first profit margin; and
    generating the offer associated with the third state.

9. The method of claim 8 further comprising deleting one or more states from the plurality of states which are configured to generate offers which provide profit margins equal to or higher than the first profit margin.

10. The method of claim 1 wherein determining if the first consumer purchased the product offered by the first offer during the first time period comprises automatically monitoring information related to purchases made by the first consumer.

11. The method of claim 1 wherein providing the first offer to the first consumer comprises:
    selecting a distribution channel for providing the first offer to the first consumer; and
    using the distribution channel to communicate the first offer to the first consumer.

12. The method of claim 11 wherein the distribution channel is selected from a group of distribution channels comprising web-based distribution channels, direct mail distribution channels, interactive voice recognition systems, and dispensers.

13. The method of claim 1 wherein the first threshold and the second threshold are received via a graphical user interface.

14. The method of claim 1 wherein the second offer offers the product from the plurality of products at a second price that is greater than the first price.

15. The method of claim 1 wherein the third offer offers the product from the plurality of products at a third price that is less than the first price.

16. A computer program product stored on a computer-readable storage medium for making offers to consumers for a plurality of products sold by a seller, the computer program product comprising:
code for receiving information identifying a plurality of consumers;
code for receiving purchase history information for the plurality of consumers, the purchase history information comprising information related to purchases made by the plurality of consumers;
code for identifying a first consumer from the plurality of consumers based upon the purchase history information and the information identifying the plurality of consumers;
code for generating a first offer, the first offer offering a product from the plurality of products for purchase at a first price for a first time period, wherein sale of the product offered by the first offer provides a first profit margin for the seller;
code for receiving a first threshold "M", wherein "M"$\geq$1;
code for receiving a second threshold "N", wherein "N" $\geq$1 and "N" $\leq$"M";
(a) code for providing the first offer to the first consumer;
(b) code for determining if the first consumer purchased the product offered by the first offer during the first time period;
code for repeatedly invoking codes (a) and (b) until the first consumer has purchased the product offered by the first offer at least "N" times or until the first offer has been offered to the first consumer "M" times;
if the first consumer purchased the product offered by the first offer at least "N" times, code for generating a second offer for the first consumer, the second offer offering a product from the plurality of products for purchase for a second time period, wherein sale of the product offered by the second offer provides a second profit margin for the seller which is greater than the first profit margin; and
if the first consumer did not purchase the product offered by the first offer at least "N" times and the first offer has been offered to the first consumer "M" times, code for generating a third offer for the first consumer, the third offer offering a product from the plurality of products for purchase for a third time period, wherein sale of the product offered by the third offer provides a third profit margin for the seller which is less than the first profit margin.

17. The computer program product of claim 16 further comprising:
code for providing a state machine to control generation of offers, the state machine comprising a plurality of states wherein each state is configured to generate an offer;
wherein the code for generating the first offer comprises:
code for entering a first state of the state machine; and
code for generating the first offer associated with the first state;
wherein the code for generating the second offer comprises:
code for transitioning from the first state to a second state which is configured to generate an offer which provides a profit margin for the seller that is greater than the first profit margin; and
code for generating the offer associated with the second state; and
wherein the code for generating the third offer comprises:
code for transitioning from the first state to a third state which is configured to generate an offer which provides a profit margin for the seller that is lower than the first profit margin; and
code for generating the offer associated with the third state.

18. The computer program product of claim 16 wherein:
the code for receiving the first threshold comprises code for receiving the first threshold via a graphical user interface; and
the code for receiving the second threshold comprises code for receiving the second threshold via the graphical user interface.

19. The computer program product of claim 16 wherein the second offer offers the product from the plurality of products at a second price that is greater than the first price.

20. The computer program product of claim 16 wherein the third offer offers the product from the plurality of products at a third price that is less than the first price.

21. The computer program product of claim 16 wherein:
the code for receiving the information identifying the plurality of consumers comprises code for receiving an identifier associated with at least one consumer from the plurality of consumers; and
the code for receiving the purchase history information for the plurality of consumers comprises code for receiving purchase history information associated with the identifier.

22. The computer program product of claim 16 wherein the code for identifying the first consumer from the plurality of consumers based upon the purchase history information and the information identifying the plurality of consumers comprises:
code for receiving a plurality of conditions to be satisfied in order to receive the first offer;
code for determining a set of consumers from the plurality of consumers who satisfy the plurality of conditions; and
code for identifying the first consumer from the set of consumers.

23. The computer program product of claim 16 wherein the code for providing the first offer to the first consumer comprises:
code for selecting a distribution channel for providing the first offer to the first consumer; and
code for using the distribution channel to communicate the first offer to the first consumer.

24. A system for making offers to consumers for a plurality of products sold by a seller, the system comprising:
a communication network;
a computer system coupled to the communication network; and
a distribution channel;
wherein the computer system is configured to:
receive information identifying a plurality of consumers;
receive purchase history information for the plurality of consumers, the purchase history information comprising information related to purchases made by the plurality of consumers;

identify a first consumer from the plurality of consumers based upon the purchase history information and the information identifying the plurality of consumers;

generate a first offer offering a product from the plurality of products for purchase by the first consumer, wherein sale of the product offered by the first offer provides a first profit margin for the seller;

receive a first threshold "M", wherein "M"≧1;

receive a second threshold "N", wherein "N"≧1, and "N"≦"M";

(a) provide the first offer to the distribution channel which is configured to advertise the first offer to the first consumer;

(b) determine if the first consumer purchased the product offered by the first offer during the first time period;

repeat (a) and (b) until the first consumer has purchased the product offered by the first offer at least "N" times or until the first offer has been offered to the first consumer "M" times;

if the first consumer purchased the product offered by the first offer "N" times, generate a second offer offering a product from the plurality of products for purchase by the first consumer for a second time period, wherein sale of the product offered by the second offer provides a second profit margin for the seller which is greater than the first profit margin; and if the first consumer did not purchase the product offered by the first offer at least "N" times and the first offer has been offered to the first consumer "M" times, generate a third offer offering a product from the plurality of products for purchase by the first consumer for a third time period, wherein sale of the product offered by the third offer provides a third profit margin for the seller which is less than the first profit margin.

25. The system of claim 24 wherein the computer system is configured to generate the third offer only if the third profit margin is above a margin threshold configured by the seller.

26. The system of claim 24 wherein the information identifying the plurality of consumers received by the computer system comprises an identifier associated with at least one consumer from the plurality of consumers, and the purchase history information for the plurality of consumers received by the computer system comprises purchase history information associated with the identifier.

27. The system of claim 24 wherein in order to identify the first consumer from the plurality of consumers based upon the purchase history information and the information identifying the plurality of consumers, the computer system is configured to:

receive a plurality of conditions to be satisfied in order to receive the first offer;

determine a set of consumers from the plurality of consumers who satisfy the plurality of conditions; and identify the first consumer from the set of consumers.

28. The system of claim 24 wherein the computer system is further configured to:

provide a state machine to control generation of offers, the state machine comprising a plurality of states wherein each state is configured to generate an offer; and wherein in order to generate the first offer for the first consumer, the computer system is configured to:

enter a first state of the state machine; and generate the first offer associated with the first state.

29. The system of claim 28 wherein in order to generate the second offer, the computer system is configured to:

transition from the first state to a second state which is configured to generate an offer which provides a profit margin greater than the first profit margin; and generate the offer associated with the second state.

30. The system of claim 29 wherein, in order to generate the second offer, the computer system is further configured to delete states from the plurality of states which are configured to generate offers which provide profit margins lower than the first profit margin.

31. The system of claim 28 wherein in order to generate the third offer, the computer system is configured to:

transition from the first state to a third state which is configured to generate an offer which provides a profit margin lower than the first profit margin; and generate the offer associated with the third state.

32. The system of claim 31 wherein, in order to generate the third offer, the computer system is further configured to delete states from the plurality of states which are configured to generate offers which provide profit margins equal to or higher than the first profit margin.

33. The system of claim 24 wherein in order to determine if the first consumer purchased the product offered by the first offer during the first time period, the computer system is configured to automatically monitor information related to purchases made by the first consumer.

34. The system of claim 24 wherein in order to provide the first offer to the distribution channel, the computer system is configured to:

select the distribution channel from a group of distribution channels comprising web-based distribution channels, direct mail distribution channels, interactive voice recognition systems, and dispensers; and use the selected distribution channel to advertise the first offer to the first consumer.

35. The system of claim 24 wherein the computer system comprises a display system which is configured to display a graphical user interface, and the computer system is configured to receive the first threshold and the second threshold via the graphical user interface.

* * * * *